United States Patent
Gupta et al.

(10) Patent No.: US 7,409,714 B2
(45) Date of Patent: Aug. 5, 2008

(54) VIRTUAL INTRUSION DETECTION SYSTEM AND METHOD OF USING SAME

(75) Inventors: Ramesh M. Gupta, San Jose, CA (US); Parveen K. Jain, San Jose, CA (US); Keith E. Amidon, Fremont, CA (US); Fengmin Gong, Livermore, CA (US); Srikant Vissamsetti, Fremont, CA (US); Steve M. Haeffele, Los Gatos, CA (US); Ananth Raman, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1112 days.

(21) Appl. No.: 10/171,805

(22) Filed: Jun. 13, 2002

(65) Prior Publication Data

US 2003/0004688 A1      Jan. 2, 2003

Related U.S. Application Data

(60) Provisional application No. 60/298,220, filed on Jun. 13, 2001.

(51) Int. Cl.
  *G06F 11/00* (2006.01)
  *G06F 9/00* (2006.01)
(52) U.S. Cl. .............................. 726/23; 726/11; 726/22; 726/24; 726/25
(58) Field of Classification Search .................... 726/23, 726/11, 3, 22
  See application file for complete search history.

(56) References Cited

U.S. PATENT DOCUMENTS

| | | | |
|---|---|---|---|
| 5,557,742 A | 9/1996 | Smaha et al. | |
| 5,621,889 A | * 4/1997 | Lermuzeaux et al. | ......... 726/22 |
| 5,769,942 A | 6/1998 | Maeda | |
| 5,798,706 A | 8/1998 | Kraemer et al. | |

(Continued)

FOREIGN PATENT DOCUMENTS

WO      02/075547      9/2002

(Continued)

OTHER PUBLICATIONS

Giovanni Vigna, et al., "NetSTAT: A Network-Based Intrusion Detection System," Department of Computer Science, *University of California Santa Barbara*, pp. 1-46. Supported under Agreement No. F30602-97-1-0207.

(Continued)

*Primary Examiner*—Emmanuel L Moise
*Assistant Examiner*—Techane J Gergiso
(74) *Attorney, Agent, or Firm*—Zilka-Kotab, PC; Christopher J. Hamaty

(57) ABSTRACT

A method of forming a virtual intrusion detection system includes the step of positioning a set of sensors in a network environment, each sensor supporting multiple logical traffic paths. The method also includes the step of providing a set of sensor management systems corresponding to the set of sensors. This set of sensor management systems enforces a set of virtual intrusion detection systems, wherein each virtual intrusion detection system corresponds to a predetermined logical traffic path through the set of sensors, each virtual detection system providing sensor traffic information solely to authorized parties.

14 Claims, 18 Drawing Sheets

U.S. PATENT DOCUMENTS

| | | | |
|---|---|---|---|
| 5,805,801 A * | 9/1998 | Holloway et al. | 726/22 |
| 5,812,763 A * | 9/1998 | Teng | 726/25 |
| 5,864,683 A | 1/1999 | Boebert et al. | |
| 5,892,903 A | 4/1999 | Klaus | |
| 5,898,830 A | 4/1999 | Wesinger, Jr. et al. | |
| 5,905,859 A | 5/1999 | Holloway et al. | |
| 5,919,257 A | 7/1999 | Trostle | |
| 5,919,258 A * | 7/1999 | Kayashima et al. | 726/23 |
| 5,940,591 A | 8/1999 | Boyle et al. | |
| 6,052,788 A | 4/2000 | Wesinger, Jr. et al. | |
| 6,088,804 A * | 7/2000 | Hill et al. | 726/25 |
| 6,119,236 A | 9/2000 | Shipley | |
| 6,154,844 A | 11/2000 | Touboul et al. | |
| 6,178,509 B1 | 1/2001 | Nardone et al. | |
| 6,185,678 B1 | 2/2001 | Arbaugh et al. | |
| 6,185,689 B1 | 2/2001 | Todd, Sr. et al. | |
| 6,243,815 B1 | 6/2001 | Antur et al. | |
| 6,279,113 B1 * | 8/2001 | Vaidya | 726/23 |
| 6,301,699 B1 | 10/2001 | Hollander et al. | |
| 6,405,318 B1 * | 6/2002 | Rowland | 726/22 |
| 6,477,651 B1 * | 11/2002 | Teal | 726/23 |
| 6,484,203 B1 | 11/2002 | Porras et al. | 709/224 |
| 6,487,666 B1 * | 11/2002 | Shanklin et al. | 726/33 |
| 6,578,147 B1 * | 6/2003 | Shanklin et al. | 726/22 |
| 6,609,205 B1 * | 8/2003 | Bernhard et al. | 726/22 |
| 6,647,400 B1 * | 11/2003 | Moran | 707/205 |
| 6,684,335 B1 * | 1/2004 | Epstein et al. | 726/23 |
| 6,704,874 B1 * | 3/2004 | Porras et al. | 726/22 |
| 6,725,377 B1 * | 4/2004 | Kouznetsov | 726/23 |
| 6,775,657 B1 * | 8/2004 | Baker | 706/45 |
| 6,789,202 B1 * | 9/2004 | Ko et al. | 726/23 |
| 6,804,783 B1 * | 10/2004 | Wesinger et al. | 726/11 |
| 6,895,436 B1 * | 5/2005 | Caillau et al. | 709/224 |
| 6,910,135 B1 * | 6/2005 | Grainger | 726/23 |
| 7,055,173 B1 * | 5/2006 | Chaganty et al. | 726/11 |
| 7,127,743 B1 * | 10/2006 | Khanolkar et al. | 726/23 |
| 7,134,141 B2 * | 11/2006 | Crosbie et al. | 726/23 |
| 7,159,237 B2 * | 1/2007 | Schneier et al. | 726/3 |
| 7,225,255 B2 * | 5/2007 | Favier et al. | 709/225 |
| 7,234,168 B2 | 6/2007 | Gupta et al. | 726/25 |
| 7,308,715 B2 | 12/2007 | Gupta et al. | 726/23 |
| 2002/0019945 A1 * | 2/2002 | Houston et al. | 713/201 |
| 2002/0032871 A1 | 3/2002 | Malan et al. | 713/201 |
| 2002/0078381 A1 * | 6/2002 | Farley et al. | 713/201 |
| 2002/0087882 A1 * | 7/2002 | Schneier et al. | 713/201 |
| 2002/0112185 A1 * | 8/2002 | Hodges | 713/201 |
| 2003/0004689 A1 | 1/2003 | Gupta et al. | 702/188 |
| 2003/0009699 A1 | 1/2003 | Gupta et al. | 713/201 |
| 2003/0014662 A1 | 1/2003 | Gupta et al. | 713/200 |
| 2003/0037141 A1 | 2/2003 | Milo et al. | 713/201 |

FOREIGN PATENT DOCUMENTS

| | | |
|---|---|---|
| WO | 02/088925 | 11/2002 |
| WO | WO 02/101516 | 12/2002 |

OTHER PUBLICATIONS

Y. F. Jou, et al., and S.F. Wu, et al., "Design and Implementation of a Scalable Intrusion Detection System for the Protection of Network Infrastructure," *Advanced Networking Research*, MCNC, RTP, NC, et al., pp. 15.

Ivan Krsul, "Computer Vulnerability Analysis Thesis Proposal," The Coast Laboratory, Department of Computer Sciences, *Purdue University*, IN, Technical Report CSD-TR-97-026. Apr. 15, 1997, pp. 1-23.

Matt Bishop, "Vulnerabilities Analysis," Department of Computer Science, *University of California at Davis*, pp. 1-12.

Matt Bishop, "A Taxonomy of UNIX System and Network Vulnerabilities," *CSE-95-10*, May 1995, pp. 17

Matt Bishop, et al., "A Critical Analysis of Vulnerabilities Taxonomies," *CSE-96-11*, Sep. 1996, pp. 1-14.

Dawn X. Song, et al., "Advanced and Authenticated Marking Schemes for IP Traceback," Report No. UCB/CSD-00-1107, Computer Science Division (EECS), *University of California, Berkeley*, Jun. 2000, pp. 1-11.

Chien-Lung Wu, et al., IPSec/PHIL (Packet Header Information List): Design, Implementation, and Evaluation, *NC State University*, Raleigh, NC, et al., pp. 6.

Allison Mankin, et al., "On Design and Evaluation of "Intention-Driven" ICMP Traceback," *USC/ISI*, et al., pp. 7.

Brian Carrier, et al., "A Recursive Session Token Protocol for Use in Computer Forensic and TCP Traceback," CERIAS, *Purdue University*, West Lafayette, IN, et al., 2002 IEEE, pp. 7.

Stefan Savage, et al., "Practical Network Support for IP Traceback," Department of Computer Science and Engineering, *University of Washington*, Seattle, WA. Copyright 2000, pp. 12.

Diheng Qu, et al., "Statistical Anomaly Detection for Link-State Routing Protocols," Computer Science Department, *North Carolina State University*, Raleigh, NC, et al.., Supported under Contract No F30602-96-C-0325, pp. 9.

U.S. Appl. No. 10/171,937, filed Jun. 13, 2002.

Office Action Summary from U.S. Appl. No. 10/171,937 mailed on Mar. 9, 2006.

Final Office Action Summary from U.S. Appl. No. 10/171,937 mailed on Jul. 3, 2006.

Examiner's Answer from U.S. Appl. No. 10/171,937 mailed on Jun. 6, 2007.

U.S. Appl. No. 10/172,756, filed Jun. 13, 2002.

PCT Application No. PCT/US02/18981 filed Jun. 13, 2002.

* cited by examiner

| | |
|---|---|
| iflt | if LocB≠0<br>    compare LocA to LocB<br>else<br>    compare LocA to Value field<br>    if LocA < Value<br>        execute following ops<br>    else<br>        skip following ops<br>    endif<br>endif |
| iflte | if LocB ≠ 0<br>    compare LocA to LocB<br>else<br>    compare LocA to Value field<br>    if LocA ≤ Value<br>        execute follwoing ops until next else or fi<br>    else<br>        skip following ops<br>    endif<br>endif |
| ifeq | if LocB ≠ 0<br>    compare LocA to LocB<br>else<br>    compare LocA to Value field<br>    if LocA = Value<br>        execute following ops until next else or fi<br>    else<br>        skip following ops<br>    endif<br>endif |
| ifneq | if LocB ≠ 0<br>    compare LocA to LocB<br>else<br>    compare LocA to Value field<br>    if LocA = Value<br>        execute following ops until next else or fi<br>    else<br>        skip following ops<br>    endif<br>endif |
| ifgte | if LocB ≠ 0<br>    compare LocA to LocB<br>else<br>    compare LocA to Value field<br>    if LocA ≥ Value |

*FIG. 11A*

|      |                                                                                                                                                                                                                                             |
| ---- | ------------------------------------------------------------------------------------------------------------------------------------------------------------------------------------------------------------------------------------------- |
|      |         execute following ops until next else or fi<br>    else<br>        skip following ops<br>    endif<br>endif |
| ifgt | if LocB ≠ 0<br>    compare LocA to LocB<br>else<br>    compare LocA to Value field<br>    if LocA > Value<br>        execute following ops until next else or fi<br>    else<br>        skip following ops<br>    endif<br>endif |
| ifql | if (locA = ValueA) and (LocB = ValueB)<br>    execute following ops until next else or fi<br>else<br>    skip following ops<br>endif |
| else | halt/resume instruction exection |
| fi   | endif |

*FIG. 11B*

VIRTUAL INTRUSION DETECTION SYSTEM AND METHOD OF USING SAME

This application claims priority to provisional patent application 60/298,220, which was filed on Jun. 13, 2001.

BRIEF DESCRIPTION OF THE INVENTION

This invention relates generally to computer networks. More particularly, this invention relates to network security sensors and distributed network security sensor architectures used to implement intrusion detection and protection.

BACKGROUND OF THE INVENTION

The prevalence of computer vulnerabilities and malicious computer hackers is well documented. Thus, there are ongoing concerns about computer security. Computer security anxieties span a spectrum of computer configurations, including individual computers, local area networks, and wide area networks.

There are a number of problems associated with current computer security technologies. For example, while there is available information on different computer attacks and countermeasures, there are inadequate techniques for developing, deploying, and managing this information. Another computer security problem relates to the distribution of evolving network security information, such as new computer attack profiles and signatures. It would be highly desirable to provide an efficient and rapid mechanism for distributing this information throughout a network.

As computer network traffic continues to grow, there are increasing demands to improve the processing efficiency of computer security tasks. In order to achieve gigabit and higher intrusion detection speeds, new methods and techniques are required for packet inspection and processing. Ideally, such methods and techniques would be scalable and support dynamic signature set updates.

Another problem with current computer security technologies is that they require a single organization to own, maintain and control their own computer security equipment. It would be highly desirable to allow different organizations to share computer security resources through a subscription-based intrusion detection platform.

Distributed denials of service attacks are a common problem in networked environments. A distributed denial of service attack may take many forms. One common form of a distributed denial of service attack is for a single computer to send a message to a group of computers instructing the computers to access a target computer. The group of computers then forwards the same message on to a supplemental group of computers. Ultimately, the target computer is inundated with access requests and effectively shuts down. It would be highly desirable to identify a technique for detecting, tracing, and countering distributed denial of service attacks.

In order to provide effective protection for existing computers and computer networks, it is necessary to address these numerous computer security problems. Ideally, a single platform and architecture could be deployed to address these problems. Such a system should be easy to deploy and manage, thereby providing a low cost of ownership. Notwithstanding these cost considerations, the system must have high performance, including the capacity to efficiently detect and protect against known and unknown computer attacks.

SUMMARY OF THE INVENTION

A method of forming a virtual intrusion detection system includes the step of positioning a set of sensors in a network environment, each sensor supporting multiple logical traffic paths. The method also includes the step of providing a set of sensor management systems corresponding to the set of sensors. This set of sensor management systems enforces a set of virtual intrusion detection systems, wherein each virtual intrusion detection system corresponds to a predetermined logical traffic path through the set of sensors, each virtual detection system providing sensor traffic information solely to authorized parties.

The invention provides a single platform and architecture to address a variety of network security problems. The system of the invention is easy to deploy and manage, and thereby provides a low cost of ownership. However, the system of the invention also has high performance, including the capacity to efficiently detect and protect against known and unknown computer attacks.

BRIEF DESCRIPTION OF THE FIGURES

The invention is more fully appreciated in connection with the following detailed description taken in conjunction with the accompanying drawings, in which:

FIGS. 11A & 11B illustrate exemplary state machine instructions to be carried out in accordance with an embodiment of the invention.

Like reference numerals refer to corresponding parts throughout the several views of the drawings.

DETAILED DESCRIPTION OF THE INVENTION

Figure 1:
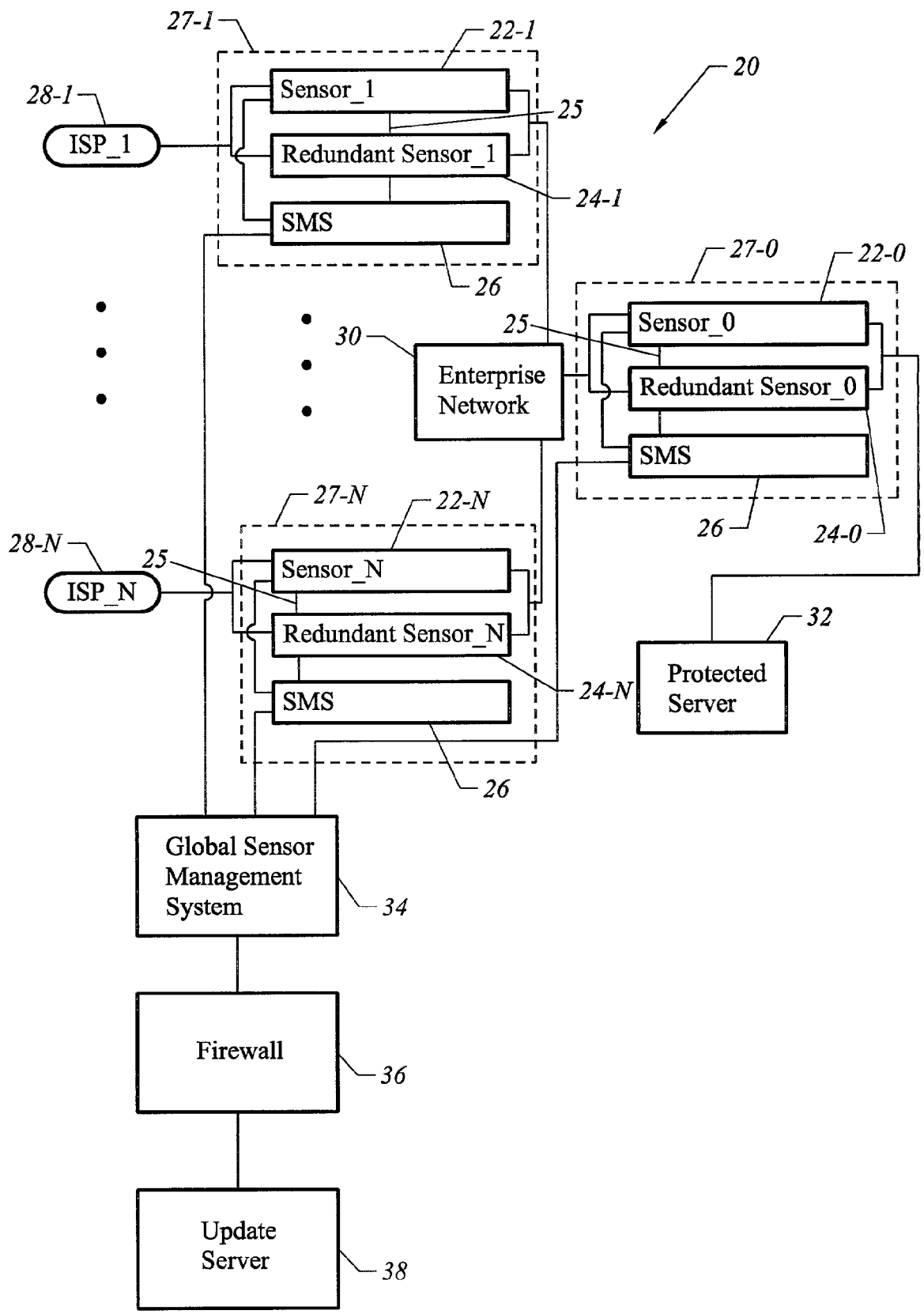
FIG. 1 illustrates a computer network environment implementing the network security techniques of the invention.

FIG. 1 illustrates an exemplary computer network 20 incorporating network security devices and processes associated with the invention. The network 20 includes a set of network security sensors 22 configured in accordance with the invention. Each sensor 22 operates as a platform to implement local and distributed security operations performed in accordance with the invention. FIG. 1 illustrates a set of primary sensors 22 and redundant sensors 24. Preferably, a dedicated link 25 is positioned between the primary sensors 22 and the redundant sensors 24. As discussed below, the primary sensor 22 updates the redundant sensor 24 with changes in the configuration data. This ensures that the primary sensor 22 and the redundant sensor 24 are synchronized and that the redundant sensor 24 can be activated in the event of the failure of the primary sensor 22.

A sensor management system 26 is associated with a sensor 22 or set of sensors 22 and 24. The sensor management system provides supervisory control of a sensor 22. The sensor management system 26 may be used to implement a shared-resource virtual intrusion detection system, as discussed below. A single sensor management system 26 may be used to control multiple sets of primary sensors 22 and redundant sensors 24.

The combination of the sensor 22, redundant sensor 24, and sensor management system 26 is referred to as a local sensor security module 27. As shown in FIG. 1, local sensor security modules 27 may be distributed throughout a network. In this example, local sensor security modules 27_1 through 27_N are positioned between an enterprise network 30 and Internet service providers 28_1 through 28_N. In addition, a local sensor security module 27_0 is positioned between the enterprise network 30 and a protected server 32.

The operations of the local sensor security modules 27 may be coordinated through a global sensor management system 34. The global sensor management system 34 performs distributed system management operations and provides a global consolidated view of all sensors and all the traffic these sensors are monitoring. In addition, the global sensor management system 34 supports the implementation of a global shared-resource virtual intrusion detection system. In addition, the global sensor management system 34 tracks information from the local sensor security modules 22 to identify and respond to distributed denial of service attacks.

FIG. 1 illustrates that the network 20 includes an update server 38. The update server 38 is used to coordinate the delivery of signature and software updates to the local sensor security modules 27, as discussed below. Preferably, the update server 38 is protected by a firewall 36.

The overall architecture of an embodiment of the invention has been described. Attention is now directed toward a more particular description of the individual components of the architecture.

Figure 2:
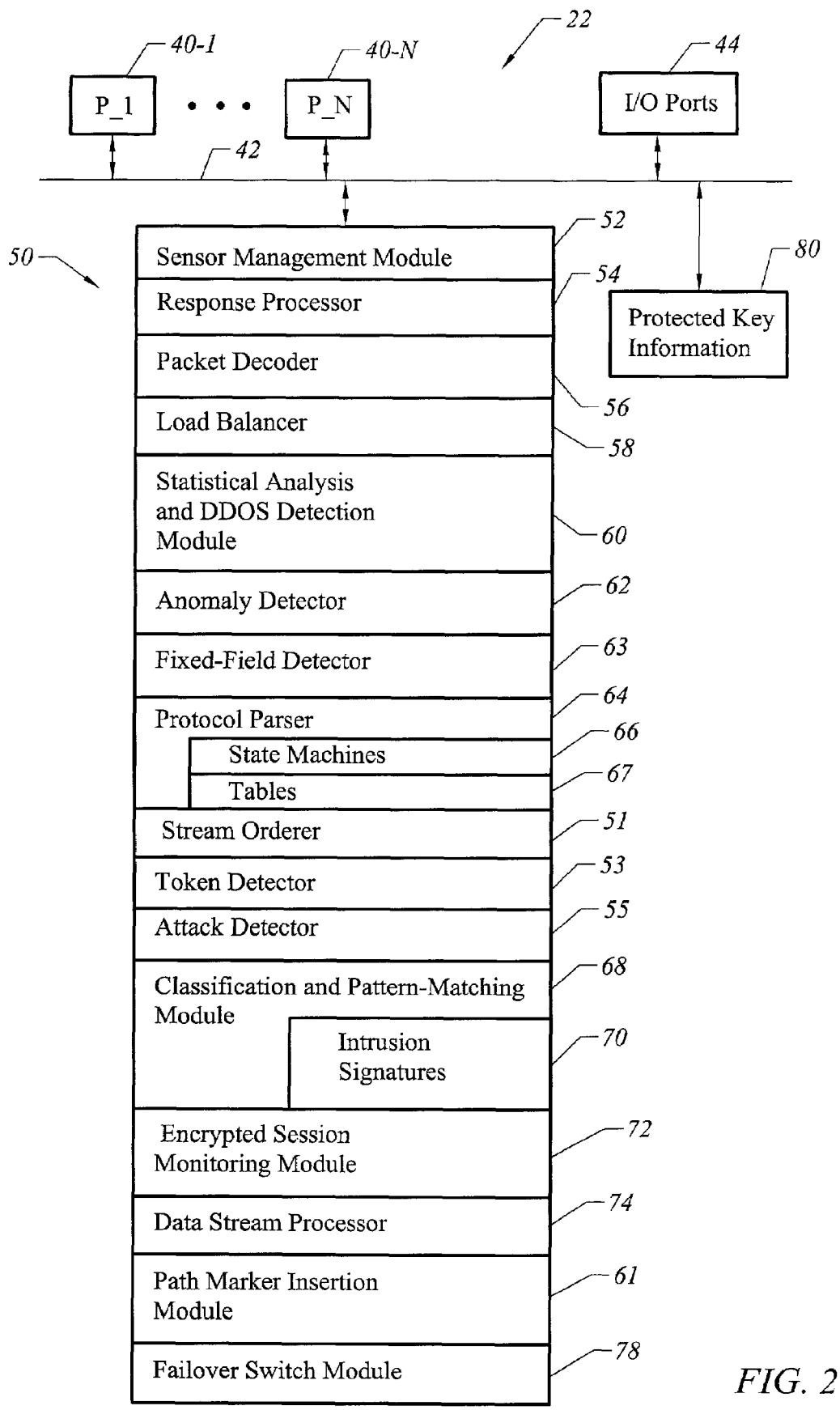
FIG. 2 illustrates a network security sensor implemented in accordance with an embodiment of the invention.

FIG. 2 illustrates a sensor 22 configured in accordance with an embodiment of the invention. Preferably, the sensor 22 includes a set of processor 40_1 through 40_N, with each processor optimized to perform a different function, as discussed below. The processors 40 are connected to a system bus 42 or a set of buses or a switching fabric, which are represented by the single system bus 42. Also connected to the system bus 42 is a set of input/output ports 44. The ports 44 provide interfaces for routing network traffic. In addition, they include interfaces for the sensor management system 26.

In one configuration, the system bus 42 is also connected to a memory 50, which includes primary and/or secondary memory. The memory 50 stores a set of executable programs utilized to implement functions of the invention. In an alternate embodiment of the invention, the executable programs are stored in memory associated with each processor that executes a program.

In the embodiment of FIG. 2, the memory 50 stores a sensor management module 52, which coordinates overall sensor operations. Alternately, the sensor management module 52 may be implemented in a separate processor or processor board used to coordinate overall sensor operations. In the embodiment of FIG. 2, the memory 50 stores a response module 54 for coordinating responses to processing exceptions.

A packet decoder 56 is also stored in memory 50. The packet decoder 56 coordinates the decoding of network packets and performs protocol conformance verification. Alternately, the functionality of the packet decoder 56 is implemented with a dedicated processor 40. A load balancer 58 is preferably used to distribute processing responsibilities across the processors 40.

FIG. 2 also illustrates a statistical analysis and distributed denial of service detection module 60. This executable program analyzes statistical patterns associated with processed traffic. In addition, it identifies distributed denial of service attacks. A path marker insertion module 61 is used to insert path markers into network traffic. The path markers are used to identify the actual path traversed by the distributed denial of service attacks, as discussed below.

The memory 50 also stores an anomaly detector 62, which is used to identify network traffic anomalies indicative of an attack. A fixed-field detector 63 and a protocol parser 64 are also stored in the memory 50. The protocol parser 64 is implemented with a set of state machines 66 and associated tables 67. As discussed below, the state machines process a data stream by generating intrusion detection information with each state transition. In combination, the fixed-field detector 63 and the protocol parser 64 operate as a signature processing system, as discussed below. Supporting this signature processing system is a stream orderer 51 that organizes data streams for a token detector 53. In turn, this token detector 53 transmits tokens containing state information and other instructions for the protocol parser 64.

The memory 50 also stores a classification and pattern-matching module 68. This module has an associated set of intrusion signatures 70. The module is used to compare incoming network traffic with the set of intrusion signatures 70, as discussed below.

The memory 50 also stores an encrypted session monitoring module 72. This module 72 allows the sensor 22 to decrypt otherwise secure network traffic in a non-intrusive manner. As discussed below, protected key information 76 stored within the sensor 22 is used to implement the operations performed by the encrypted session monitoring module 72.

The memory 50 also stores a data stream processor 74. The data stream processor 74 reassembles IP fragments and sends the reassembled IP fragments back to the load balancer. In addition, the data stream processor 74 reassembles TCP streams and forwards the reassembled streams to the signature and anomaly detection module 62.

The memory 50 also stores a fail-over switch module 78. The fail-over switch module 78 is used to synchronize information between a primary sensor 22 and a redundant sensor 24 and to switch control from the primary sensor 22 to the redundant sensor 24 in the event that the primary sensor 22 fails.

Figure 3:
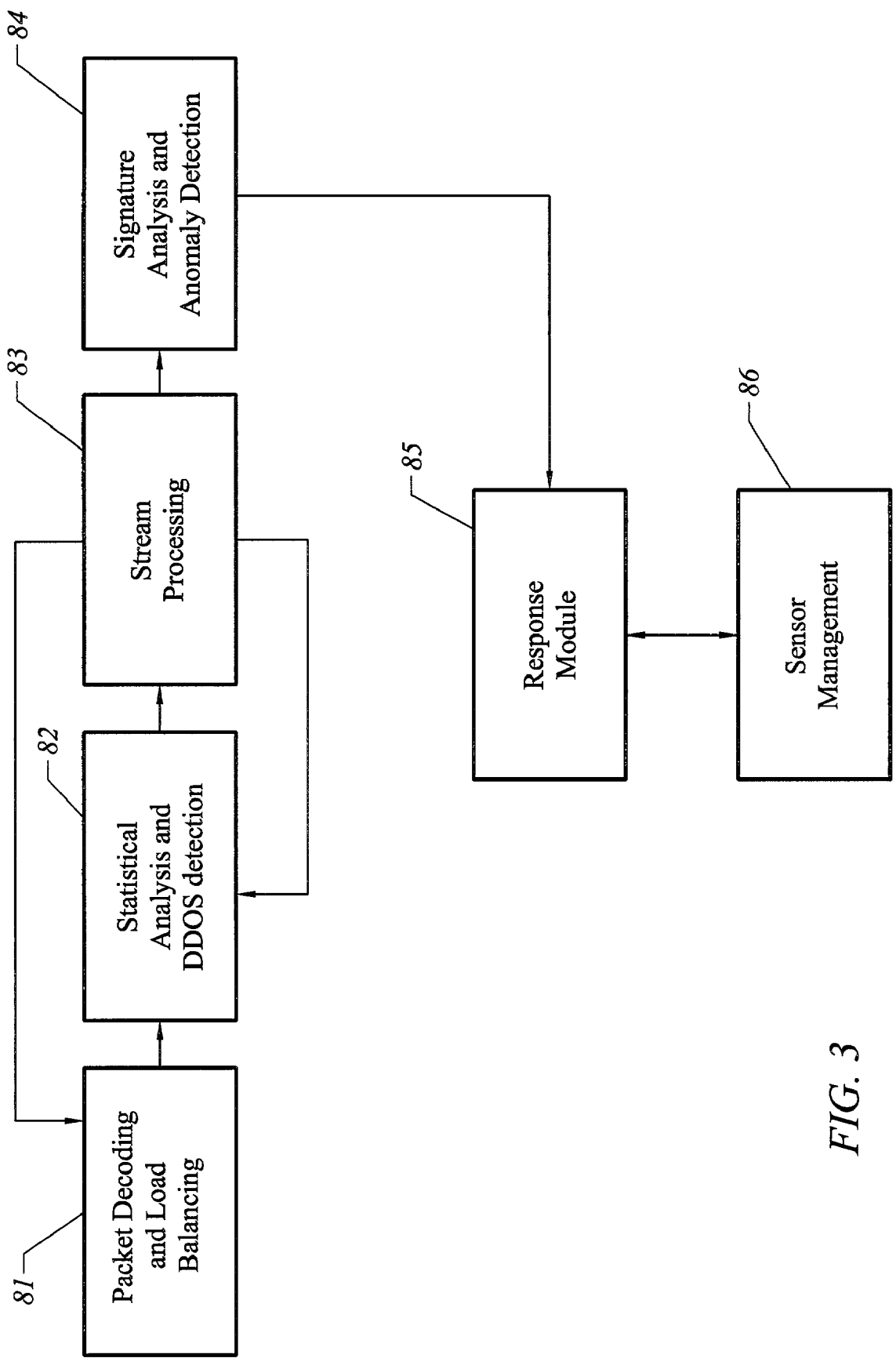
FIG. 3 illustrates processing steps performed by an embodiment of the network security sensor of the invention.

The processing performed by the sensor 22 is more fully appreciated in connection with FIG. 3. FIG. 3 illustrates processing steps performed by the sensor 22. Incoming traffic to the sensor 22 is processed for packet decoding, protocol conformance verification and load balancing 81. The packet decoder 56 and load balancer 58 are used for this operation.

The traffic is then processed for statistical analysis and distributed denial of service detection 82. These operations may be performed by module 60. Stream processing is then performed 83. This operation may be implemented with the data stream processor 74. Signature and anomaly detection 84 is then performed. The anomaly detector 62 may perform these anomaly detection operations.

The overall processing is supervised through sensor management 86, which is implemented with the sensor management module 52. A response module handles response processing 85. In particular, the response processor 54 determines the response actions for the specific attack. The response processor 54 is configured by the system administrator. Once configured, the response processor 54 responds to specific attacks.

Figure 4A:
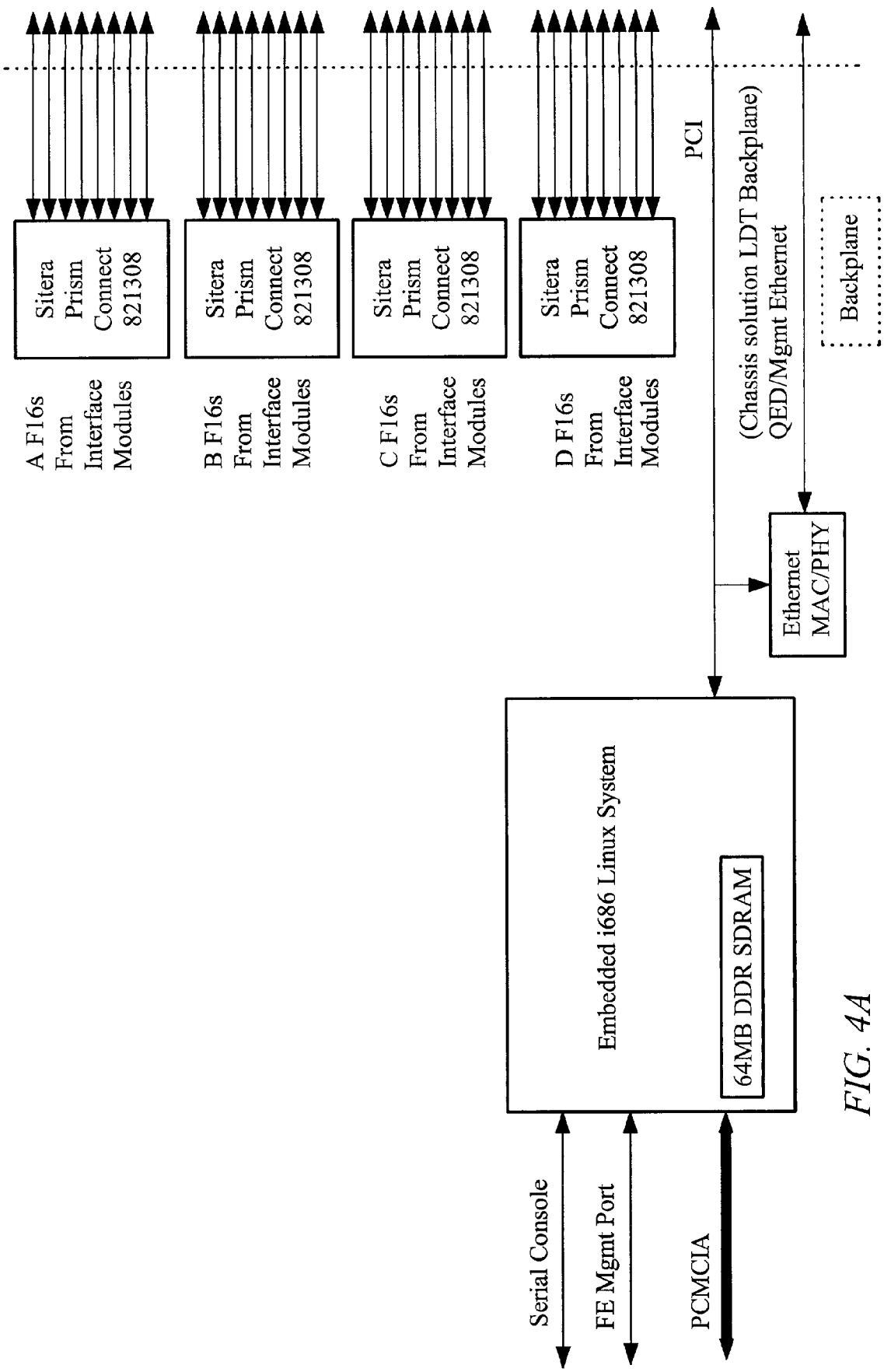
FIG. 4A illustrates an embodiment of a hardware sensor management module utilized in accordance with an embodiment of the invention.
Figure 4B:
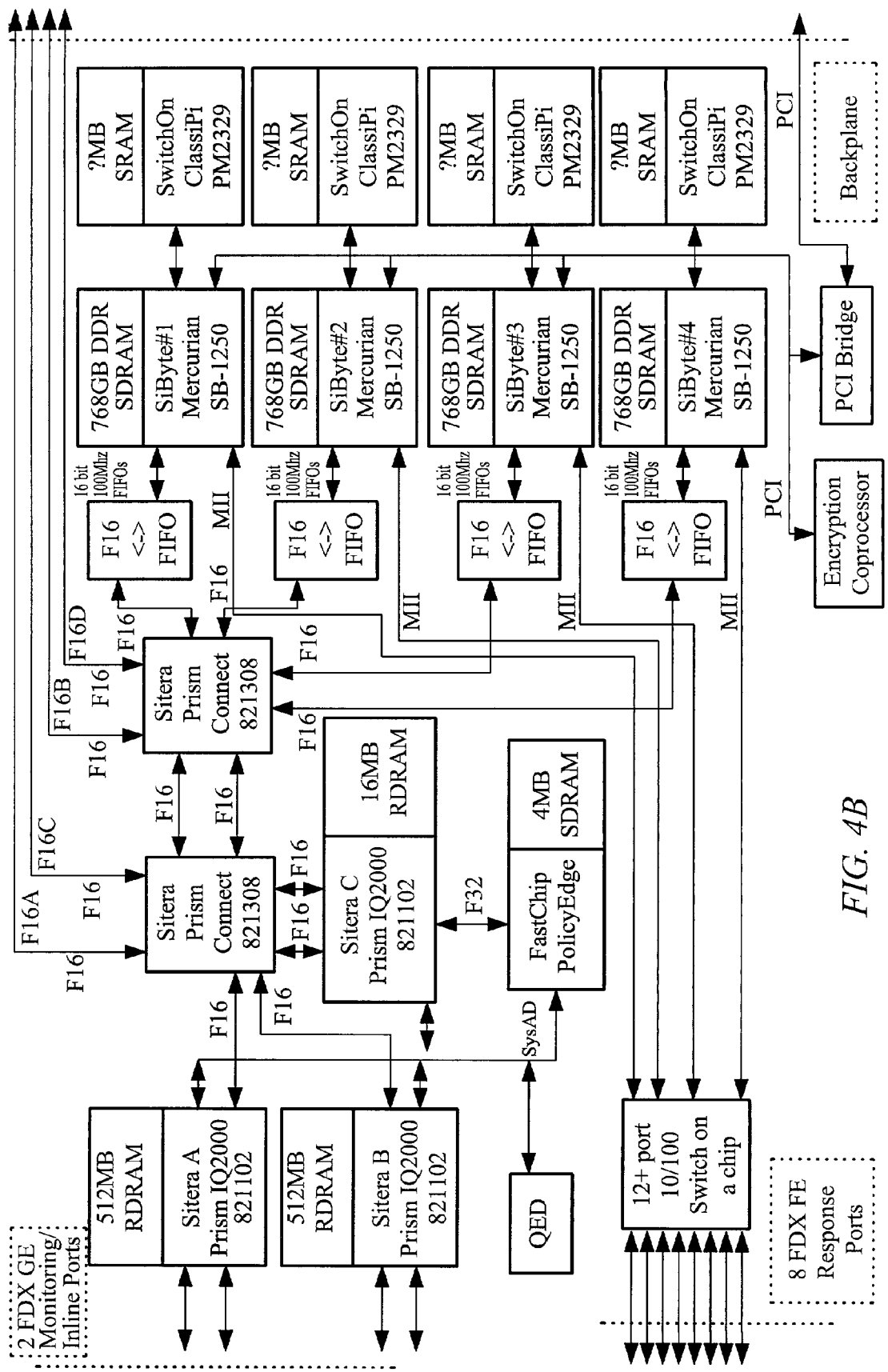
FIG. 4B illustrates a specific hardware implementation of a network security sensor of the invention.

As previously indicated, the sensor 22 may be implemented with a set of processors. The different software modules stored in memory 50 run on selected processors of the set of processors. Thus, for example, the sensor management module 52 has been implemented to run on a x86 single board computer, an example of which is illustrated in FIG. 4A. The packet decoder and load balancer have been implemented to run on two network processors (Sitera Prism IQ2000). The response processor 54 has been implemented to run on a set of high performance CPUs (e.g., the SiByte Mercurian SB-1250). The statistical analysis and distributed denial of service (DDOS) detection module has been implemented to run on a co-processor (e.g., the FastChip PolicyEdge processor). The classification and pattern-matching module has been implemented with a co-processor (e.g., the Switch-On PM2329). The anomaly detector 62 has been implemented to run on a set of high performance CPUs (e.g., the Sitera Prism Connect 821308). FIG. 4B illustrates a specific circuit topology used to implement an embodiment of the sensor 22. In this embodiment, software modules executed by a processor are stored in the primary memory associated with the processor.

Returning to FIG. 3, after packet decoding and load balancing 80, statistical analysis and DDOS detection 84 is performed. The statistical analysis and DDOS detection module 60 operates in connection with a path marker insertion module 61. The path marker insertion module 61 inserts DDOS identification information into the network traffic processed by the sensor 22. The module 60 also monitors the DDOS identification information received from other upstream sensors in the network. When violations of DDOS detection profiles are observed, appropriate DDOS attack flags are set. This can result in remedial action performed at the sensor 22. In addition, the attack flag signal is transported across the network to the protected computer 32, which takes additional remedial actions to prevent the DDOS attack. Various techniques for implementing these operations are discussed below.

Returning to FIG. 2, the anomaly detector 62 is used to identify computer attacks. In this context, anomaly means any event, state, or behavior that is considered to be abnormal by certain pre-defined standards. For example, the existence of a remote root shell on a system that only expected console root login is an anomaly. Seeing large numbers of successive small IP fragments is an anomaly. A web server suddenly seeing a lot of requests from new IP addresses may also be considered an anomaly.

Anomaly-based intrusion detection approaches complement the signature-based approaches by offering a means to detect attacks whose signatures are not yet known or attacks that exhibit modified behavior (e.g., intentionally stealthy attacks or variants of existing attacks in new environments). The term system refers to any entity whose relevant state or behavior is under observation. For example, it can be a host or server, a given network application, or a person. The anomaly detector 62 is typically implemented in accordance with a number of operations. First, measures (or observations) of normalcy are defined for a given system. Next, a characterization of the normalcy of the system is created. This characterization is generally in a form of distributions for these measures or their derivatives. This may require a learning or training process. Next, an algorithm for building a run-time characterization of the system is defined. Measures of discrepancy between the normalcy and the run-time characterization are then defined. Once again, this may require learning or training. The measure of discrepancy and the way the actual measurement is obtained can introduce inherent differences that are accounted for in the threshold determination step. Finally, anomaly thresholds for generating appropriate alarms are defined. This approach can be implemented using multiple techniques, including statistical, neural nets, and other forms of learning mechanisms.

The anomaly detector 62 creates a characterization of the normal behavior of the system in order to achieve accurate anomaly detection (i.e., with low false positive and low false negative rates). Since different systems have different behaviors, a new characterization needs to be created for each new system to be protected through anomaly detection. In one embodiment of the invention, the anomaly detector 62 operates in two phases. In a training phase the target system needs to be in an attack-free state. Depending on the resource availability, training can be conducted either online or offline. In the online case, training data comes directly from the real-time traffic captured while the system is in operation. In the offline case, training data comes from previously captured traffic traces, which are stored in a file. The length of the training phase will typically depend on the inherent variability of the system. Training can stop automatically when certain stability criteria have been met. However, the user should be able to turn on the training mode at any time.

After the conclusion of training, the anomaly detector 62 operates in a detection phase. The detection phase produces anomaly scores for the observed packets based on the characteristic similarity between the observed and normal profile. A higher score will indicate a higher degree of deviation from the normalcy and thus a stronger intrusion alert.

While the training accounts for the difference in characteristics from system to system, there is also variability in time (e.g., the time of day) that may be significant enough to require new profiles for effective detection. The anomaly detection module supports the following general means for adaptation. First, an interface for human analysts is supplied to allow the input of final alert assessment results and to keep track of the false alarm rate changes. In the case where the false alarm rate increases and stays at a higher level, this is a good indication of a system/environment change that can be accounted for by re-training the anomaly detector 62. In the case where false alarm rates fluctuate periodically with time, it is a good indication that a new set of profiles with a different periodicity is required.

Another adaptive technique that can be implemented by the anomaly detection module 62 is to support multiple profiles that can be dynamically updated with time, or equivalently one profile that adapts continuously but more quickly. To better support creation of new profiles dynamically, the anomalous packets should be kept in a log file until it is determined that they were normal, or to be moved to long-term archive. At that time, these logged packets can be used to create the new profiles or to re-train existing profiles.

The anomaly detector 62 has been implemented to detect two types of anomalies. The first type of anomaly is identified based upon a normal profile of non-attack Internet packets. This method helps detect those attacks that are realized through specially crafted packets or other attack packets, such as denial of service or DDOS attacks. The second type of anomaly is identified based upon the normal traffic profile of a target domain, which may be a single host/sever, a sub-net, or an enterprise network. The detection is based on the change of traffic patterns over network links.

The first technique of profiling typical non-attack packets relies upon the occurrence or co-occurrence of values in a selected set of fields. That is, in the absence of active attacks, there are generally defined patterns or ranges of values taken by the header fields of a packet. These patterns can be identified through statistical analysis or learned by artificial neural networks. These patterns can then be compared against the actual field values of a packet on the wire to detect abnormal packets. In one embodiment, this comparison is carried out by establishing a threshold at one extreme of the range or pattern in question, and checking to see if a packet's field value exceeds this threshold. In addition, some "forbidden" rules are manually introduced to ensure that certain packets are always flagged due to their potential damaging impact. For example, a ping packet (ICMP ECHO REQ) with multicast/broadcast destinations is a cause for concern, and is thus an anomaly.

Advantageously, such normal profiles can be created from packet traces generated entirely from known non-attack implementations of the protocols. Thus, it is not necessary to learn the profiles during a guaranteed attack free session.

By way of example, three types of packets can be characterized: TCP, UDP, and ICMP. In the case of TCP and UDP packets, one embodiment of the invention establishes normal profiles characterizing the contents of (or, in some cases, simply checking certain values of) one or more packet fields. The first of such fields, which can also be thought of as variables, is IP packet length. This embodiment of the invention establishes a normal profile, or range, of packet lengths. Any packets with lengths outside this range, or beyond some upper or lower threshold, can be considered abnormal and marked as anomalous. Those of skill in the art will recognize that the invention includes the determination of thresholds from such ranges through any known means, for example choosing a percentile value of the range.

The next variable concerns fragment bits. In the case where the "don't fragment" bit is set, one expects a corresponding offset equal to zero. If the "more fragment" bit is set, all fragments except the last should have offset values from a finite set, as determined by MTUs of the known network switches/routers. These offsets should also never be more than the maximum IP datagram length. A violation of any of these conditions can be considered as an anomaly. A related variable concerns the IP fragmentation identifier field. If multiple packets with overlapping fragmentation offsets are detected, this condition is also considered an anomaly.

Another variable compares the protocol identification field to the finite set of known IP protocols; if the new protocol identifier is not recognized, this signals an anomaly. Yet another variable examines the set of TCP code bits to determine whether they contain legal bit combinations. Combinations other than legal ones signal an anomaly. For example, OS scanners are known to use strange combinations of code bits (e.g., SYN and FIN) to determine the target OS type.

One variable specific to UDP concerns protocol data unit (PDU) length. A normal range for the PDU length of UDP packets can be established, with packets exceeding this range, or a threshold at the upper end of the range, being marked as anomalous. The set of configured services (e.g., VOIP or other packet audio/video applications) can assist in establishing initial values for such a range, as various applications typically transmit UDP packets with characteristic PDU length ranges.

A range can also be established characterizing the various destination addresses of IP packets received. Here, the range can characterize the destination address in any known manner. For instance, the range can be a numerical range characterizing the numerical values of the various destination addresses. It can also be a range of address/mask pairs. Depending on the size of the secured domain, an accurate profile of destination addresses may require capturing multiple networks and/or subnets. A different yet related range characterizes the range of IP packet destination ports. Here, for instance, the finite set of ports corresponding to legally configured services can be characterized. Packets with destination ports outside this set cam be designated as anomalous.

With respect to ICMP packets, a different set of variables may be considered. As in the TCP/UDP case, IP packet length can be profiled, as there is a well-defined set of known ICMP messages that can be used to define a normal range. As this range is different from TCP/UDP packets, ICMP packet length can be maintained as a separate variable from TCP/UDP packet length. Another variable concerns packet fragmentation. This fragmentation can simply be profiled as in the TCP/UDP case above or, because fragmentation in ICMP packets is rare, its occurrence can automatically be considered as an anomaly. For example, large pings on limited occasions can generate fragmentation, and are also often a cause for alarm.

The range of protocol identifications can also be considered a variable and characterized as above. Finally, the range of ICMP type and code combinations can be characterized, as there exists a well-defined set of ICMP type and ICMP code combinations. Any combinations outside this set can therefore be considered anomalous. In addition, a given domain is made aware of the transmission of an ICMP redirect packet by one of its routers. This behavior can also be considered as outside this range, and thus anomalous.

It should be noted that various embodiments of the invention simply include profile generation without limiting themselves to generating profiles by any particular method. Indeed, any method can be used. For example, variables such as IP packet length can be characterized statistically by sampling a significant number of packets. As another example, a novel approach to profiling data rates is also disclosed in a co-pending U.S. patent application Ser. No. 10/171,937 entitled "Method and Apparatus for Detecting a Distributed Denial of Service Attack," filed on Jun. 13, 2002, hereby incorporated in its entirety. This approach can be extrapolated to variables besides data rate, and also provides a method of updating such a characterization.

The second anomaly detection technique of traffic profiling characterizes the normal behavior of the target system. This behavior can be termed connectivity behavior, as it describes traffic flowing over the target system's connection to a network. The target system can be a whole enterprise network, an individual server or host machine, a class of services on a machine, or a particular user on a machine. Packet length and packet rate are the two most basic measures on a link.

In order to use these two measures to more effectively characterize the normal connectivity profile, the basic measures can be further broken down according to several attributes. For instance, packet length and packet rate can be categorized or profiled according to external link group. Where a domain is connected through multiple parallel links to the Internet or another network, inherent factors such as physical link speed and MTUs for the networking devices in each link group all affect packet rate and packet length for each link. Similarly, dynamic and asymmetric routing makes it likely that packets between a given pair of hosts may actually take different paths, or links, at various times. Aggregating traffic across all links in the link group thus provides a more complete traffic profile.

Packet length and packet rate can also be profiled according to time of day. Time of day is known to affect the type of networking applications, and thus traffic levels, invoked over a network link. For example, enterprise applications often schedule automated batch processing at after-hours times, raising network traffic. Time of day thus has an effect on both packet rate and length distribution on such links, so such a breakdown helps reduce the complexity of the normal profile with respect to time.

Basic measures can also be profiled according to packet destination. As different destinations generally offer different protocols and applications, utilize different service platforms, and have different network connectivity attributes, their basic traffic measures will vary. Subdividing basic measures according to destination thus represents further profile refinement. The same reasoning also supports the profiling of basic measures by source.

Such basic measures can also be subdivided according to service, i.e., application protocol. For example, packet length and rate profiles can be made specific to the http, ftp, or telnet protocols. Those of skill in the art will realize that not only do these protocols have very different but stable profiles in terms of measures such as PDU length, but they also exhibit very different packet rates (or, equivalently, packet arrival intervals) depending on whether human interaction is involved. Per protocol measures are thus useful in distinguishing among human users, client/server processes, or tunneling Trojans.

Depending on the domain to be protected and the categories of attacks to be protected against, detailed measures from one or more of the above categories may be appropriate, all combinations and permutations of which are encompassed by the invention. Practicing the invention thus allows users the choice of profiling network traffic according to any of the above fields or ranges, further subdivided by any of the aforementioned subdivisions. Flexibility in choosing such fields and subdivisions thereof also affords users maximum attack protection within their limited resources. Different destinations generally offer different kinds of service (thus a different portfolio of network protocols and applications). Different destinations may be using different service platforms and may have different network connectivity (different transport networks, different link bandwidths). These all have an impact on the basic traffic measures. However, when the destinations are remote domains (outgoing traffic), keeping per destination measures may be too expensive due to potentially large number of destination hosts and sub-nets. It may be reasonable for extra-net types of deployment. Again, per destination breakdown represents further refinement of profile measures.

The same reasoning applies for keeping per source measures. Similarly, per source measures may be too expensive to keep for incoming traffic, except for extra-net deployments. Assuming that one is expecting denial of service attacks from outside and that the sources are easily spoofed, refinement of measures based on source address is not very desirable.

The anomaly detector 62 also identifies application anomalies through system connectivity profile checking. Two types of connectivity profiles have been identified to capture the normal connectivity behavior of the target computer. The first type consists of a set of activity vectors. It is aimed at detecting general changes in the connectivity pattern to or from the target system/domain. The following vectors may be defined: incoming protocol, outgoing protocol, incoming destination port seen, incoming source port seen, incoming destination IP address seen, incoming source IP address seen, outgoing destination port seen, outgoing source port seen, outgoing destination IP address seen, and outgoing source IP address seen.

Take the incoming protocol vector, IN=<$p1, p2, p3, p4, p5, p6$> as an example. Pi can be TCP, UDP, ICMP, HTTP, FTP, or DNS. The elements in the vector (Pi's) are ordered from the most often seen to the least often seen protocols. Basic statistics are collected on the number of packets seen that are of these protocol types or carrying those types. Although the update of the vector can be as frequent as one for each packet arrival, the comparison of the run-time vector to the normal profile will typically happen at larger time intervals.

The ordering of the elements in the vector can be based on a number of different criteria, for example, the number of packets related to it, the total number of bytes related to it, length of the flow/session related to it, number of fragmented packets related to it, etc. In general, each element in the vector represents a separate security event and our profile captures the distribution of this set of events.

The length of the vector can be adjusted based on what measure is being used and at what granularity. For example, active incoming destination IP address seen vector can be based on network prefix or sub-net address, depending on which level the deployment environment is at (top level ISP versus local access ISP). There are only four classes of Ipv4 addresses currently used but there will be a lot more network prefix and even more sub-nets.

For the cases where the range of possible values is large, it is reasonable to define the vector with a small length N so that the first N—1 elements capture the most active specific category while the last element captures the aggregate of all the rest.

Another form of application anomaly that is identified by the anomaly detector 62 is the request-response anomaly. There are a significant number of denial of service attacks that exploit the fact that the design and/or implementation of many network applications do not handle exceptions well during operation. For example, CVE-1999-0274 documents a denial of service attack on NT DNS, which is based on sending a response to a query that was never made. CVE-2000-0041 documents a Macintosh vulnerability where the Macintosh generates a large number of ICMP data-grams in response to malformed data-grams. This makes the Macintosh a packet amplifier for flood attacks.

By identifying the set of commonly used request-response packet pairs and creating a simple balance profile, the anomaly detector 62 detects most attacks. This is accomplished by: (1) keeping a run-time count of request and response packets separately, (2) establishing a rate profile for the occurrence of these individual packets and generate an alert if the threshold of deviation is crossed, and then (3) correlate the request and response by simply checking the balances. Request-response examples include: TCP SYN-TCP SYN & ACK; TCP FIN—TCP FIN & ACK; CIMP ECHO REQ—ICMP ECHO REPLY, ARP request-ARP response, DNS query-query response, HTTP request-response.

In order to support these profiles, statistics must be collected on protocol fields beyond the TCP/UDP/IP header. Bi-directional traffic needs to be examined and correlated based on information fields that are dependent upon the application protocol.

The anomaly detector 62 is one mechanism utilized by the invention to prevent attacks. Another mechanism utilized in accordance with the invention is signature processing. The signature processing system detects attacks by looking for signatures that are specific combinations of patterns (e.g., numerical field values, string matches, and the like) existing in monitored network traffic.

In one embodiment of the invention, signature processing is implemented with the fixed-field detector 63 and the protocol processor 64. The fixed-field detector 63 performs per-packet analysis of protocols in which numeric fields can be located by simple offset/mask specifications. It is not intended to process protocols that require string matching or state to be kept between packets.

The protocol processor 64 performs complex protocol processing for protocols requiring string matching or state maintenance for up to the duration of a flow. Preferably, the protocol processor 64 has an associated functionality that ensures that all packets for a particular flow are presented to the next stage in the system in order, and with enough overlapping packet information to ensure detection of matches crossing packet boundaries. An associated token detector is preferably used to examine an in-order stream of packets for string matches indicating protocol delimiters or attacks. The token detector presents these in order of occurrence to the protocol parsing state machine 66 as tokens indicating the string that matched along with the position and length of the match.

Both the fixed-field detector and the protocol parser 64 generate Signature Sub-IDs (SSIDs) that indicate the presence of subsets of the patterns required for detection of a particular signature. The classification and pattern matching module 68 accepts the SSIDs in the order in which they occur and determines if all the SSIDs required to form the complete pattern of a signature occurred. The pattern signatures are stored as intrusion signatures 70. For each complete signature, the classification and pattern matching module 68 raises an AttackID (AID) that indicates the attack that was found in the communications being monitored.

The response processor 54 responds to AIDs. The response processor 54 generates alerts that provide notification of an attack. The response processor 54 also attempts to prevent the attack. Short-term responses include terminating TCP connections. Long-term responses include packet logging for further analysis to improve detection and response.

The protocol parser 64 is implemented using a generic state machine that is configured for each protocol parsed. The generic state machine allows changes to protocol parsing without the introduction of new code onto the sensor. In signature detection, where only a subset of the fields of any given protocol is known to have vulnerabilities in various implementations, this allows performance optimization without limiting the future detection capability of the sensor.

Those skilled in the art will appreciate that the generic state machine approach of the invention has a number of other advantages. For example, this approach allows the separation of signature development and code development, allowing intrusion detection specialists to do the former, while software engineers focus on the latter, with fewer dependencies between them. This approach also facilitates improved customization, since the sensor management system 26 can customize the protocol parsing mix per sensor through the state machine configuration tables rather than through different code images. The generic state machine approach also facilitates rapid implementations to support new protocols.

The protocol parser 64 allows one to specify the parsing of application layer protocols in a table-driven manner. This allows new or updated parsing to be introduced without requiring any new code (e.g., a new software image), which in turn allows real-time dynamic updates of the entire signature detection engine without interruption to current processing.

The protocol parser 64 is implemented to use generic operations executed on each state transition in order to collect information from the data stream carrying the protocol under analysis. The collected information is stored and is subsequently used in order to modify the future behavior of the state machine.

Figure 5:
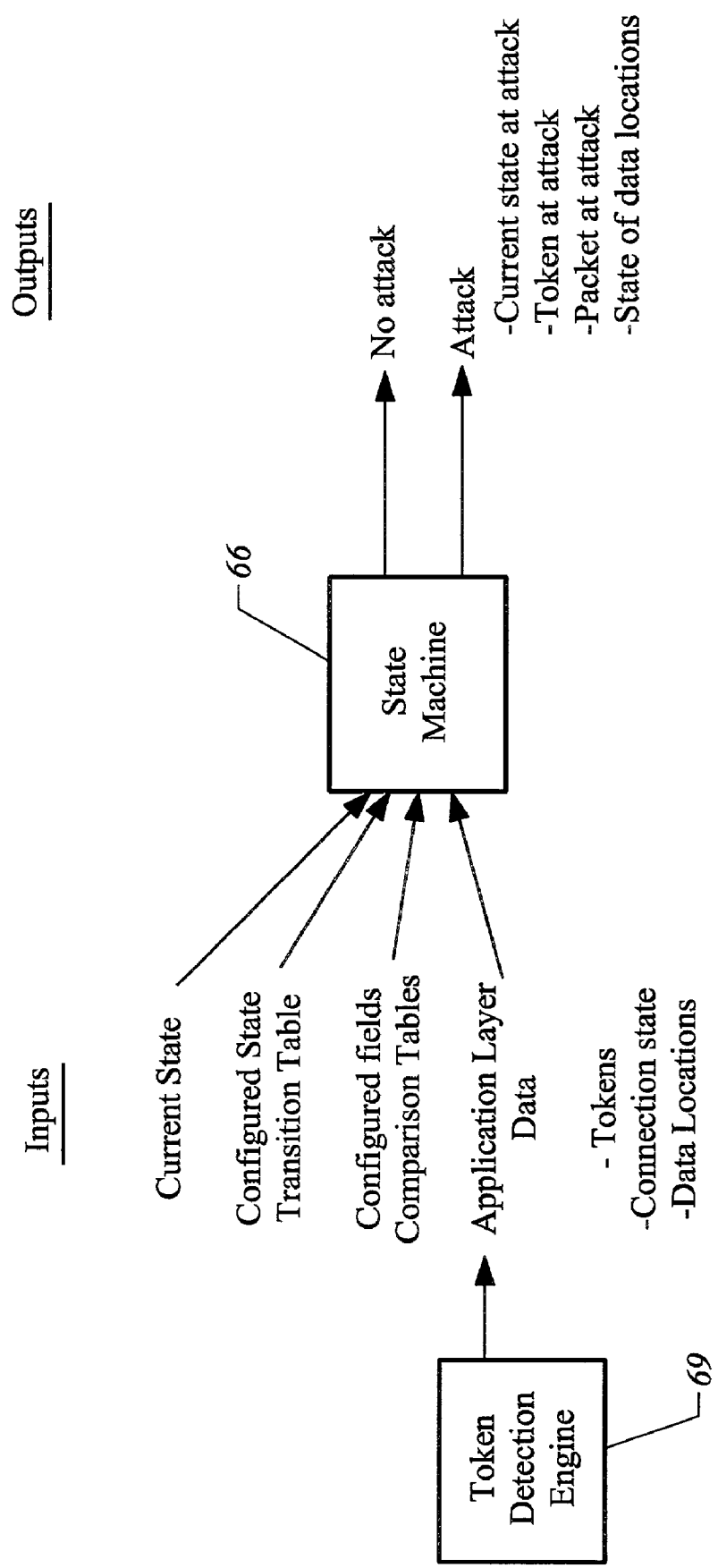
FIG. 5 illustrates input and output information associated with the protocol parsing state machine of the invention.

FIG. 5 illustrates the inputs and outputs for the state machine 66. The inputs that drive the protocol parsing state machine include the current state, the configured state transition table, the configured field comparison tables, and information derived from the token detection engine 69, which includes information derived from the in-order application layer data sent between hosts during a monitored connection. The derived information includes a stream of detected string matches in the data (tokens), information on the current progress of the connection between the hosts (connection state), and the set of initially empty generic data locations that are used during processing (data locations).

The tokens detected within the data stream are provided to the state machine in order from the beginning of the stream. Since the sensor only sees the stream as a set of inter-related non-overlapping, possibly out-of-order packets, the token matching system must order the data and ensure that matches are made across packet boundaries. Provided to the state machine along with the token are the offset of the token in the packet in which it was found, and the length of the token match. In addition to the string match tokens, the following protocol tokens are given to the state machine in protocol events: start of processing of packet from client to server, start of processing of packet from server to client, processing reached end of packet from client to server, processing reached end of packet from server to client, close of connection from client to server, and close of connection from server to client. The connection information includes: the stream offset of the beginning of the packet being processed, which allows calculation of stream offsets of token matches; stream offset transition triggers; and a single stream processing suspend offset, which can be set to −1 to indicate processing should be suspended for the remainder of the stream. The data locations all start out cleared to zero when a new instance of a state machine is created. During processing, the generic state machine can modify the values of data in these locations and makes tests on them.

At the highest level, the state machine output is a Boolean value indicating if an attack signature (Signature SubIds) has been found in the application data sent on a monitored connection up to the time of processing. If no Signature SubIds was found, no other information is needed or given. If one was found, the following information may be provided: the current state, the token being processed, including packet offset, the transition operation specification that was being processed, the packet being processed, and the state of the data locations.

Figure 6:
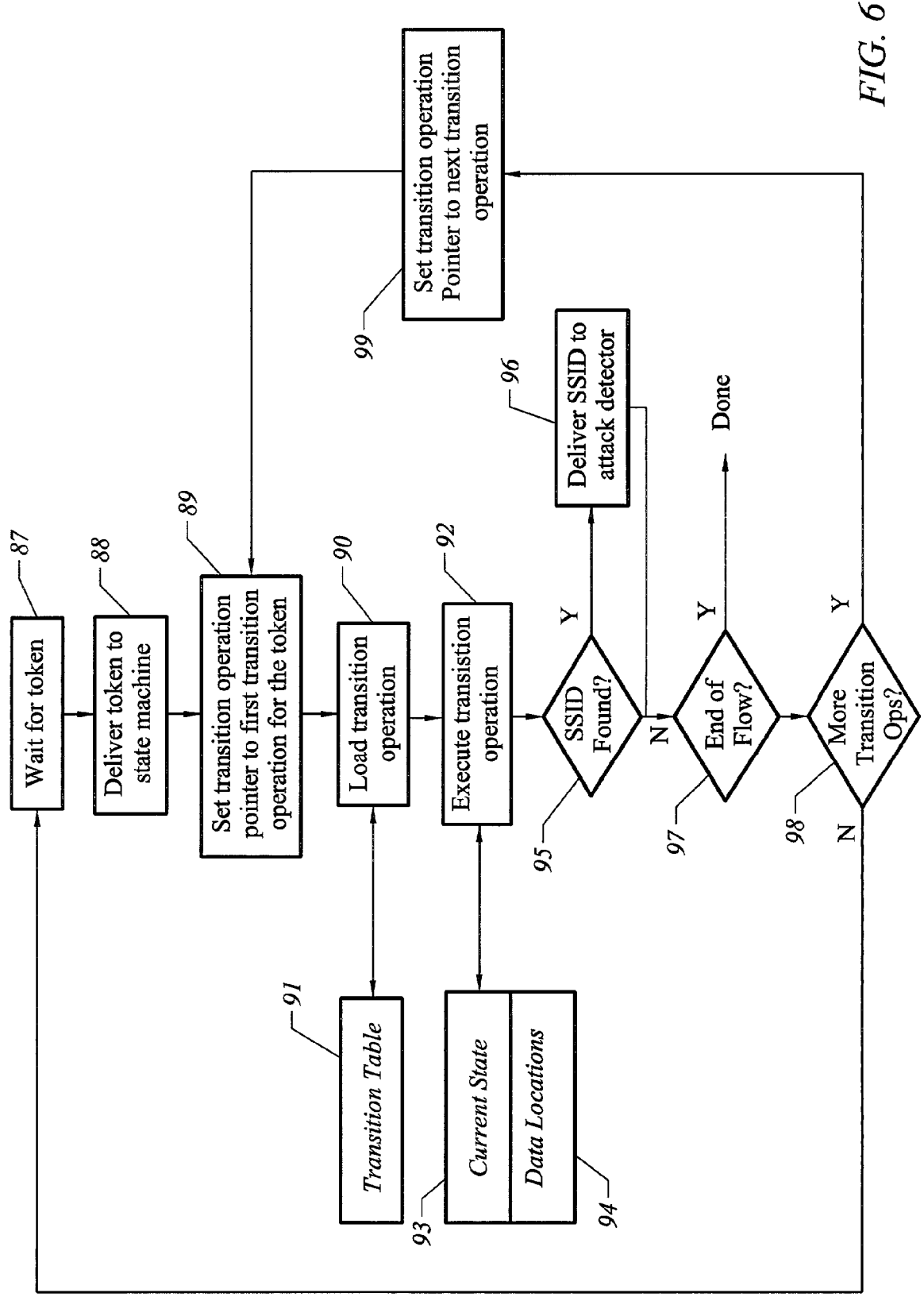
FIG. 6 illustrates general state machine processing operations performed in accordance with an embodiment of the invention.

The general operation of the state machine is illustrated in FIG. 6. There is an initial wait for a token (block 87). Once received, the token is delivered to the state machine (block 88). The transition operation pointer is then set to the first transition operation for the token (block 89). The transition operation is then loaded (block 90) by referring to the transition table (block 91). The transition operation is then executed (block 92) with reference to the current state (block 93) and the data locations (block 94). If an SSID is found (block 95—Yes), it is delivered to an attack detector (e.g., the classification and pattern matching module 68) for processing (block 96). If an SSID is not found (block 95—No), a decision is made regarding whether the flow is completed (block 97). If the flow is completed (block 97—Yes), then processing is done. If the flow is not completed (block 97—No), a decision is made regarding whether there are more transition operations (block 98). If there are more transition operations (block 98—Yes), the transition operation pointer is set to the next transition operation (block 99) and a transition operation is loaded (block 90). If no more transition operations exist (block 98—No), there is a wait for the next token (block 87).

The state machine 66 may rely upon field comparison tables that specify comparisons and corresponding signature subIDs for the various types of comparisons that can be done on protocol fields. The default comparison is a sub-string search, which does not require any field comparison table, since it is implicitly carried out by the token matching engine. Exact match and matches anchored at the start and end of a field are handled as special cases of this mechanism with operations in the transition table, an example of which is provided below. Comparisons for specific values, ranges of values, and regular expressions require field comparison tables. Each field for which a comparison of a type is required will have its own comparison table referred to by a sensor tag that starts the search.

Example field comparison tables utilized in accordance with an embodiment of the invention include a numerical equal field comparison table, a numerical range field comparison table, and a regular expression field comparison table. In one embodiment, the numerical equal field comparison has the following columns: match value (unsigned 32 bit integer) and SSID (Signature SubID, an unsigned 32 bit integer). In one embodiment, the numerical range field comparison table has: a low value (unsigned 32 bit integer), a high value (unsigned 32 bit integer), and an SSID (Signature SubID, an unsigned 32 bit integer). In one embodiment, the regular expression field comparison table includes: a regular expression (null-terminated string) and an SSID (Signature SubID, an unsigned 32 bit integer).

Figures 7, 8:
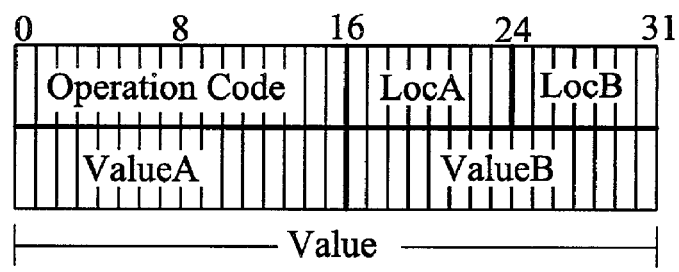
FIG. 7 illustrates a state machine transition table implemented in accordance with an embodiment of the invention.
FIG. 8 illustrates a transition operation specification format utilized in accordance with an embodiment of the invention.

An example of the transition table format is provided in FIG. 7. The transition table is a two-dimensional array where the dimensions are the allowable states and the set of detectable tokens. Each location in the array contains a list of one to n transition operation specifications, which are actions to be taken when the transition is activated. The last transition operation in the list either switches to a new state or the state machine remains in the current state.

Transition operations fall into four basic categories: (1) change state; (2) modify some value in the data locations; (3) test against the values in the data locations, signaling for further action when certain results are obtained; and (4) compare field values. In one embodiment, each transition operation specification is a 64-bit value configured as shown in FIG. 8. The 16 least significant bits are the operation code indicating the operations to be run. Each operation uses some combination of the remaining fields as operands.

Signature processing is more easily understood with reference to the following example, which illustrates the payload of an exemplary IP packet and the processing steps involved in parsing it. Assume that a sensor 22 receives a packet containing the following http GET request in its body:

GET/dir1/dir2/dvwssr.dll? Param1=value1 & Param2=value2 HTTP 1.0

Figure 9:
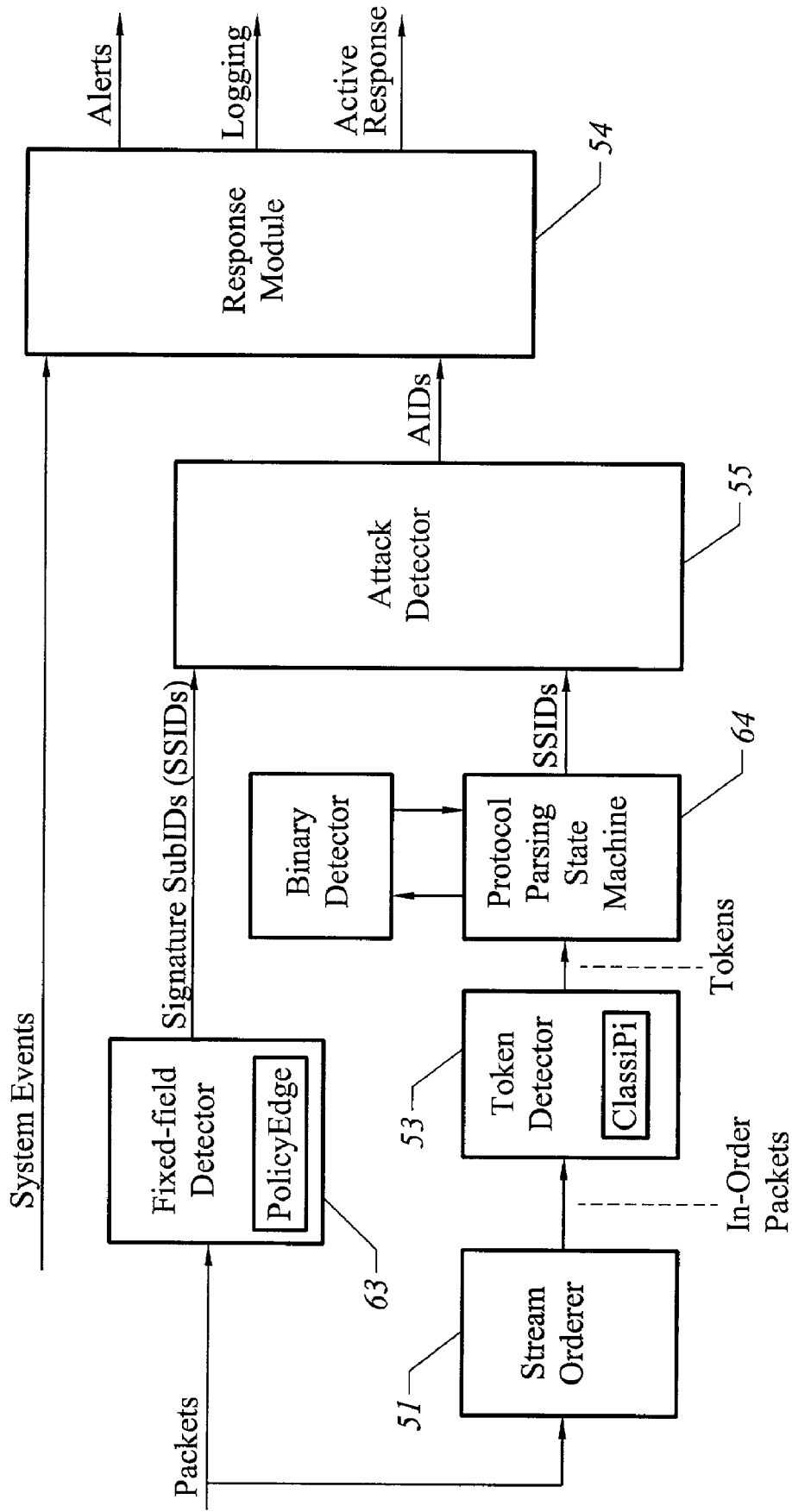
FIG. 9 illustrates a signature processing architecture utilized in accordance with an embodiment of the invention.

FIG. 9 illustrates an architecture for processing this packet in accordance with an embodiment of the invention. Once the packet is received by the sensor 22, it is cached while its contents are analyzed. The packet is first analyzed by the fixed-field detector 63, which examines both fields within the packet header and fixed locations within the packet payload. Conceptually, the fixed-field detector 63 scans the packet for attacks that leave characteristic traces in certain specific fields. One example is the LAND attack, which consists of streams of TCP SYN packets whose source IP address and TCP port number are set equal to the destination IP address and TCP port number, respectively. The fixed-field detector 63 thus scans the source and destination address fields, which always occur in fixed or predictable locations, and transmits an SSID if they are equal.

The stream orderer 51 simultaneously arranges the contents of IP packets in their proper order, so that attacks spanning multiple packet payloads can be detected. The token detector 53 parses the packets including their ordered streams of data, searches for traces of an attack, then transmits tokens summarizing its findings and instructing the protocol parser 64 accordingly. The token detector 53 scans the contents of each field (e.g., the various header fields, and then the body), compares each to a set of tables containing strings indicating portions of an attack, and transmits any matches in the form of tokens to the protocol parser 64. In this manner, the token detector 53 notifies the protocol parser 64 of strings that match an attack signature, what field or portion thereof (i.e., what state) the string is located in, and any instructions for manipulating the packet contents. The protocol parser next 64 executes the token instructions to determine whether any SSIDs exist and, if so, passes them on to the attack detector 55. If the attack detector 55 assembles a complete set of SSIDs indicating an attack, the appropriate AID is passed to the response module 54, which can discard the packet from cache, raise an alert, or take other remedial actions. If no attack is detected, the attack detector 55 can simply pass the packet on from the cache to its final destination.

The operation of the protocol parser 64 is more easily understood in connection with the http GET request shown above. This request is an http-protocol request to get the file dvwssr.dll, a restricted-access file. A GET request for this file is one signature of an attack. Upon parsing the packet(s) containing this statement, the token detector 53 compares its contents to tabulated strings, some of which (as this is a well-known form of attack) includes the GET request. The token detector 53 thus sends a token indicating the presence of a GET request and the presence of the string "dvwssr.dll"

in the URI field. It also sends tokens indicating transitions to the next state. Here, for instance, it sends a token indicating the presence of a "?" denoting a state transition to the beginning of a parameter field, and a token indicating the "&" character for transitioning state to the next parameter field. Also sent is a token indicating that the payload is written in protocol http 1.0.

Figure 10:
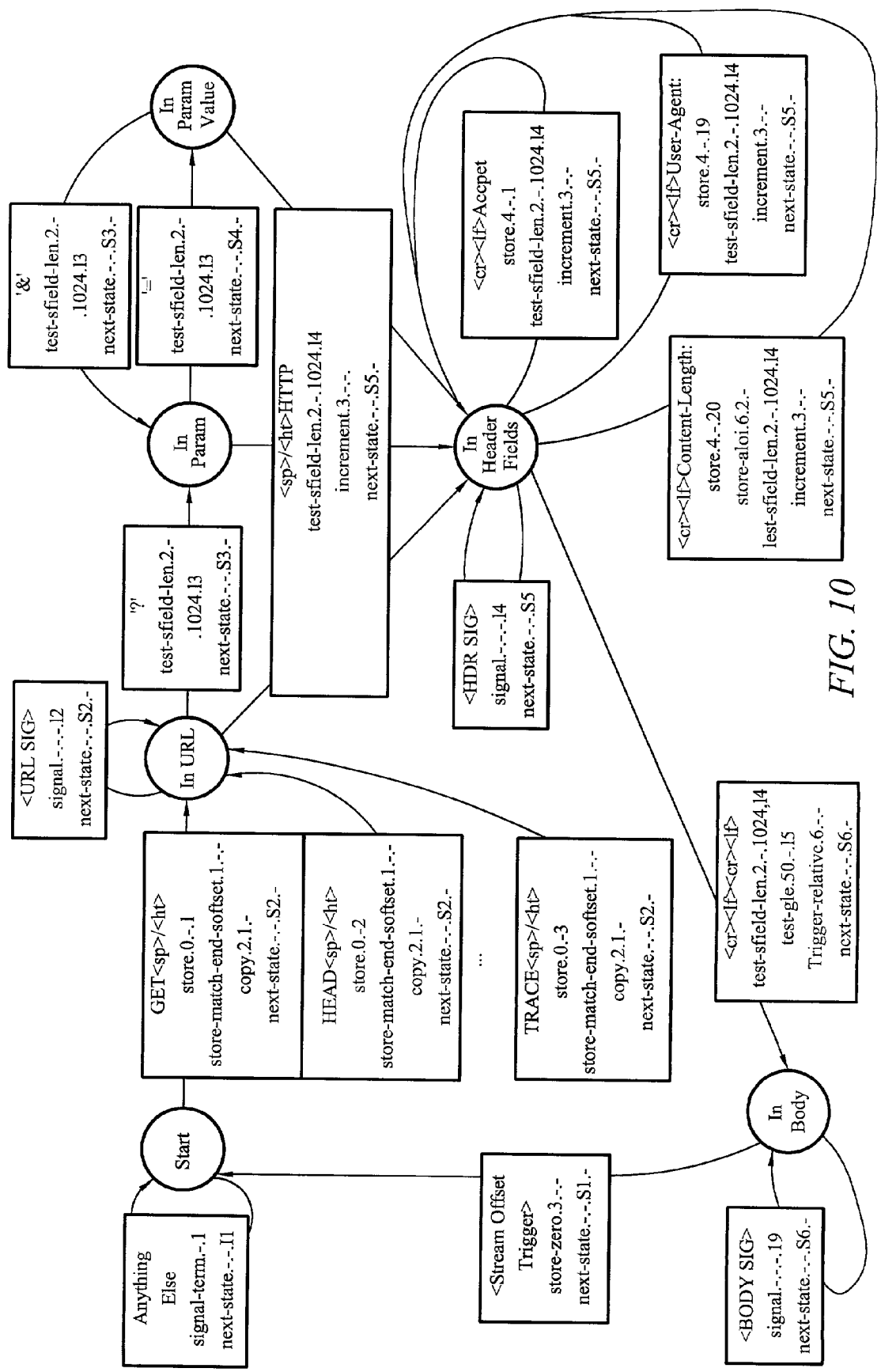
FIG. 10 illustrates an example of state machine processing performed in accordance with an embodiment of the invention.

FIG. 10 illustrates the protocol parser 64 acting on the tokens it receives. As mentioned previously, the protocol parser 64 contains a number of generalized states, shown as circles in FIG. 10. It moves among these states, and executes instructions, according to tokens it receives indicating the presence of various string matches, which are shown as boxes in FIG. 10. At each state, the protocol parser 64 executes various instructions to manipulate the information within that state if necessary, and compare it with attack information stored in the tables 67.

In the present example, the protocol parser 64 would begin at the start circle. Upon receiving the GET token, it would proceed to the URI state and compare the GET and "dvwss-r.dll" tokens to its list of tabulated attacks, which may or may not result in the generation of an SSID. Note here that the protocol parser 64 can be instructed to perform a simple comparison operation, essentially matching strings, or it can perform more complex logical or arithmetic operations, such as bit shifting, ANDs, adds, length checking, and the like, depending on what may be required to identify an attack signature. In the present example, the GET request is an HTTP string amenable to a simple comparison, so no arithmetic or other types of operations are required. Other forms of attacks, however, may have signatures that require more complex processing to identify.

Once processing of the URI strings is complete, receipt of the "?" token causes the protocol parser 64 to shift states to the first parameter state, where it executes further instructions according to the "?" token. These instructions seek to identify those attacks that have the characteristic of simply possessing a Param1 field at this location. If any are identified, the appropriate SSID is sent to the attack detector 55.

Receipt of an "=" token shifts the protocol parser 64 to the next state, which examines the actual content of the Param1 field. Here, value1 would be parsed to determine whether it matches any of the strings in the tables 67. If so, the corresponding SSID is transmitted to the attack detector 55. Subsequent receipt of an "&" token shifts the protocol parser back to the parameter state, where this comparison is repeated for the Param2 field. The lack of any other tokens terminates the comparison process. Note that the HTTP token does not play a role in the processes of FIG. 10 other than to indicate to the protocol parser 64 that HTTP is the appropriate protocol, indicating which tables of the tables 67 to use.

FIGS. 11A and 11B illustrate exemplary instructions contained within tokens according to an embodiment of the invention. Many of the instructions shown direct the protocol parser 64 to compare values within packet states to tabulated attack signatures. Note that this is not an exhaustive list and, while only comparison operations are shown, many other operations exist. More specifically, certain attacks leave signatures that can only be recognized upon mathematical, logical, or other manipulations on packet fields or states. Such operations, while not shown in FIGS. 11A and 11B, are nonetheless encompassed by the scope of the present invention. Thus, assuming complete implementation, the state machine of FIG. 10 can detect attack signatures in any request method, detecting situations where a signature may be obscured by quoting and requesting further processing in that case. The same state machine can calculate the length of the entire request URI and compare it to a threshold. It can also calculate the length of each URI query parameter name and value and compare it to a threshold. The state machine can detect attack signatures in any HTTP header field. It can also calculate the length of each HTTP header field and compare it to a threshold.

Figure 12:
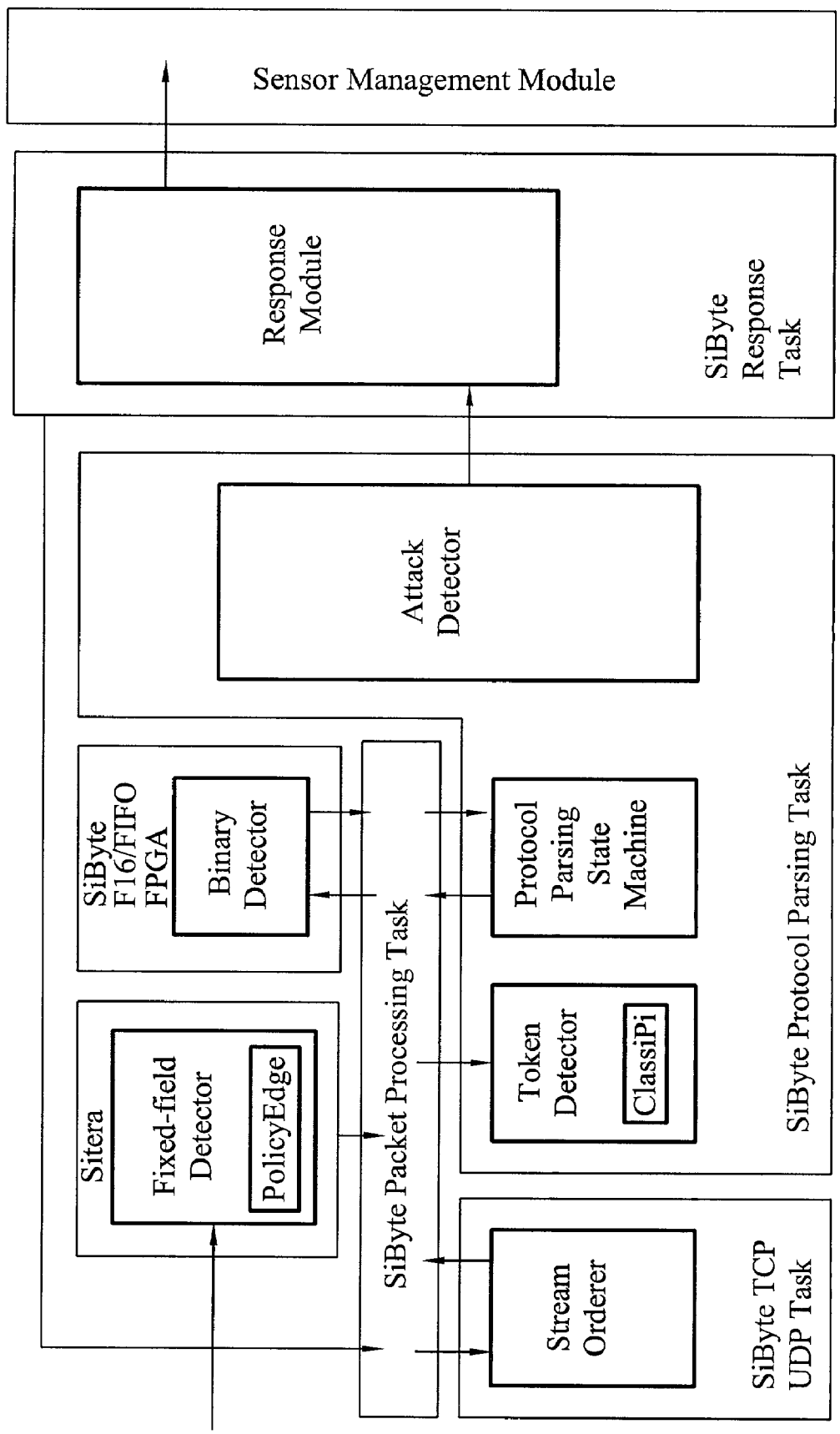
FIG. 12 illustrates an exemplary hardware configuration for carrying out signature processing operations in accordance with an embodiment of the invention.

FIG. 9 illustrates one hardware configuration in which the various components are located on one or more processors and information flows among them as shown by the arrows. This is, however, but one possible configuration. An alternate configuration is shown in FIG. 12, where a SiByte processor acts as a common bus and processor, carrying out operations as commanded by the other components and moving information among them as shown. One of skill in the art can see that many other configurations are both possible and encompassed by the present invention.

The protocol parser 64 has now been fully described. Accordingly, attention now returns to FIG. 2 and the remaining executable modules stored in memory 50. The classification and pattern-matching module 68 coordinates the comparison between the profiles of incoming and known intrusion signatures 70. As previously discussed, this module receives data from the fixed-field detector 63 and the protocol parser 64 and operates as an attack detector. In particular, the module receives Sub-Signature Identifications (SSIDs) and determines if all the SSIDs required to form a complete pattern of a signature exist. The technique for distributing and updating the intrusion signatures 70 is discussed below.

FIG. 2 also illustrates an encrypted session monitoring module 72 stored in memory 50. The encrypted session monitoring module 72 decrypts communications between a client computer and a server computer in accordance with public and private key information. In one embodiment, the decrypted information is clear text that can then be inspected for intrusions.

The encrypted session monitoring module 72 facilitates the complete monitoring of Secured Socket Layer (SSL) sessions so that it is possible to detect attacks launched through encrypted channels, such as HTTPS connections. The module 72 facilitates a non-intrusive method in that it is not visible to the normal SSL client and server applications and that a failure in the monitor will not interfere with normal SSL operation. The method also provides a means to avoid introducing any new security exposure to the SSL server.

The encrypted session monitoring module 72 addresses the problem of the increasing number of attacks launched through HTTPS connections. These attacks are not visible to current network based IDS solutions because the data is encrypted. The monitoring module 72 allows a network intrusion detection system to see attacking packets. In the absence of this feature, one must install host based intrusion detection systems on each server.

To decrypt the SSL traffic, the sensor 22 uses the web server's public/private key information. If the sensor 22 is used to protect several web servers, it needs public/private keys from each server. Since the sensor 22 saves public/private keys from several servers, it stores the keys in a tamper proof storage, illustrated as protected key information 80.

The sensor monitors the key exchange protocol between the client and the server to derive the symmetric encryption key, the encryption initialization vectors (IV) and the message authentication code (MAC) key. The sensor can monitor the key exchange protocol because it has the server's public and private key. Once the key exchange is done, the sensor uses the symmetric encryption key and the encryption IV associated with the traffic flow to perform the decryption. Once decrypted, it is able to inspect the traffic for intrusions.

The sensor 22 preferably has a secure channel to the sensor management system 26 through which the sensor obtains the server's public and private keys. The sensor management system 26 does not store the public/private keys, although it provides an interface through which the key information can be supplied.

The protected key information 80 may be attacked in several manners. One form of attack is through the programmatic access of the keys by a normal administrator. A second form of attack is the physical security of the key storage. In the event that someone either obtains access to the unit or physically takes the unit, it should not be possible to read the keys, either programmatically or by probing of the electrical interface.

The encrypted session monitoring module 72 operations may be more fully characterized as follows. The sensor management system 26 sends the public/private key information of the server along with the server's Internet protocol address. The information is encrypted with the shared key of the sensor by the sensor management system 26. The sensor 22 decrypts the information and passes the public/private key to identify a unique KEY identifier. Every time the sensor sees key management requests for a particular server, it will send the session key exchange packets along with the KEY identifier to the encrypted session monitoring module 72. The module 72 derives the symmetric session encryption key, the encryption IV and the MAC key. Any encrypted traffic seen by the sensor is processed along with the KEY identifier. The module 72 decrypts the traffic using the symmetric encryption key, the encryption Ivs and returns the decrypted traffic.

The sensor 22 also includes a fail-over switch module 78. The fail-over switch module 78 supervises the operations performed by a sensor 22. In the event of the failure of that sensor 22, it switches control to a redundant sensor 24.

In order for the redundant sensor 24 to be in a position to operate, it must be synchronized with the primary sensor 22. The fail-over switch module 78 synchronizes the information contained on the primary sensor 22 and the redundant sensor 24.

The fail-over switch module 78 can operate in three configurations. One configuration is an active-standby state without load sharing. In this scenario, one sensor (e.g., sensor 22) is deployed as the active sensor and the other is deployed as the standby sensor (e.g., redundant sensor 26). The active unit passes state information to the standby unit every time it changes. After the fail-over, the new active unit has the same connection information as the failed unit. Preferably, the active and standby sensors are connected with a dedicated fail-over link 25, which is used to exchange state information. In one embodiment of the invention, the state information passed to the standby unit includes configuration information, TCP state information, UDP application information, SSL key data and other information necessary for the standby unit to take over processing if the active unit fails. If a standby unit powers up while the active unit is already operational, the standby unit will copy all the state information from the active unit. While the standby unit is copying the state information from the active unit, any updates to the copied state information are synchronized. When the active unit fails, the standby unit obtains the IP and MAC addresses of the active unit and starts accepting and forwarding traffic. When the active sensor and the standby sensor power up at the same time, the two sensor use a handshake protocol to figure out which will be the active unit and which will be the standby unit.

Another mode of operation is active/standby with load balancing. In this mode, both sensors receive traffic, although the primary link will have most of the network traffic. The secondary link will typically have control traffic. Each sensor will copy its per flow state information to the other sensor so any sensor can take over the responsibility of the other sensor when there is a fail-over. The two sensors exchange state information in real time. After the fail-over, the working sensor assumes the responsibility for the flows that were handled by the failed sensor. In addition to providing redundancy, this model facilitates load balancing so both sensors can be utilized to provide advanced intrusion capabilities.

Since traffic can come to both sensors, the sensors use a load-balancing algorithm to determine which one processes the packets that belong to a particular flow. A flow is identified by the 5-tuple information that exists in each packet. In order to provide state-current intrusion detection, it is required that the packets directed to a flow are always processed where the flow was originally created. The load-balancing algorithm uses a hashing mechanism to determine which sensor will process the packet. Irrespective of which sensor sees the packets, based on the hash, the packets are assigned to one of the sensors.

A third redundant sensor configuration operates in an active/active with load balancing mode. In this mode, the two sensors are deployed to perform intrusion detection on four links. The traffic for a particular flow can come on any of the four links. Instead of monitoring one full duplex link, this configuration monitors four full duplex links. The two sensors are connected by four full links so each sensor can move packets to the other sensor. Each sensor has two line cards. The first line cards in each sensor are configured as a first pair and the second line cards in each sensor are configured as a second pair. To provide redundancy in this configuration, if a card in the base sensor 22 or if the entire sensor 22 goes down, the redundant sensor 24 is invoked.

When any line card in either sensor receives packets, the line cards use a hash algorithm to send packets to one of the line cards to process the packet. For a particular flow, irrespective of which line card receives a packet, the packets will always be sent to the same line card.

To implement redundancy, the first line cards in each sensor exchange state information. Similarly, the second line cards in each sensor exchange state information. In addition to maintaining its own information, each sensor maintains the state information for its counterpart line card in the other sensor. If the first line card in the first sensor goes down, all traffic meant for the first line card is delivered to the first line card in the redundant sensor. Similarly, if the second line card in the first sensor goes down, all traffic meant for the second line card is diverted to the second line card in the redundant sensor. If the base sensor 22 goes down, the traffic from the first line card and second line card in the base sensor is directed to the corresponding line cards in the redundant sensor.

Thus, the fail-over switch module 78 coordinates state redundancy for intrusion detection systems. In addition, it provides load balancing.

Figure 13:
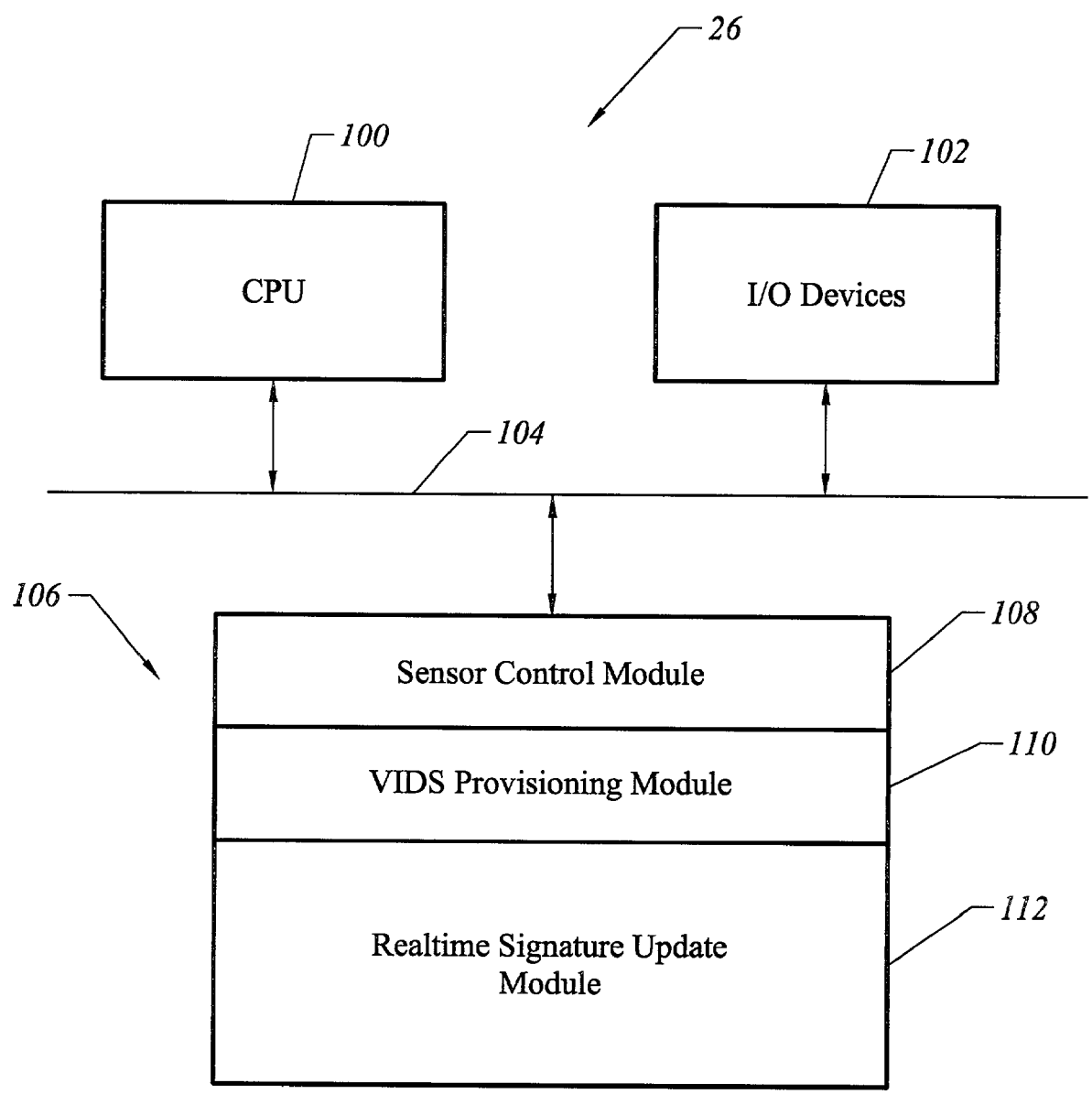
FIG. 13 illustrates a sensor control system utilized in accordance with an embodiment of the invention.

The features of an embodiment of the sensor 22 have now been fully described. Attention now turns to a description of the sensor management system 26. FIG. 13 illustrates an embodiment of a sensor management system 26. This implementation is in the form of a general-purpose computer, including a central processing unit 100 and a set of input/output devices 102, which communicate with one another over a system bus 104. The input/output devices 102 may include a keyboard, mouse, video monitor, printer, and the like.

Also connected to the system bus 104 is a memory 106, which may be primary and/or secondary memory. The memory 106 stores a set of executable programs utilized to implement features of the invention. In particular, the memory 106 stores a sensor control module 108, which performs general supervisory operations over one or more sensors 22

The sensor management system 26 also includes a virtual intrusion detection system (VIDS) provisioning module 110. This module performs local virtual VIDS operations as coordinated by the corresponding VIDS provisioning module 130 associated with the global sensor management system 34. The operation of VIDS provisioning module 110 is discussed below in connection with the VIDS provisioning module 130 of the global sensor management system 34.

The sensor management system 26 also stores a real-time signature update module 112. This module coordinates the delivery of intrusion signatures 70 to sensors 22. This module is responsive to control signals from the update server 38, as discussed below.

Figure 14:
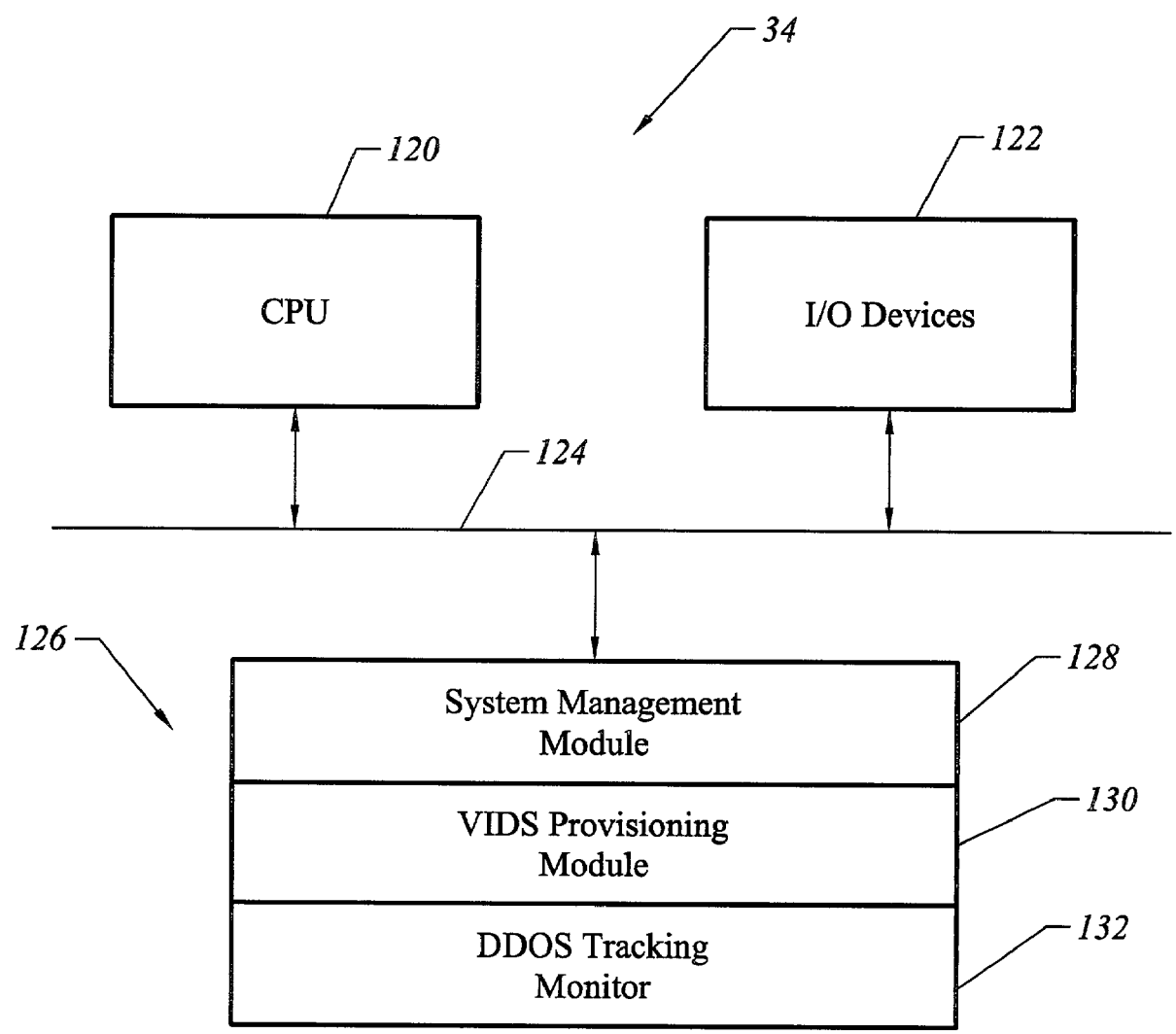
FIG. 14 illustrates a global sensor management system implemented in accordance with an embodiment of the invention.

FIG. 14 illustrates an embodiment of a global sensor management system 34. This implementation is in the form of a general-purpose computer, including a central processing unit 120 and a set of input/output devices 122, which communicate with one another over a system bus 124. The input/output devices 122 may include a keyboard, mouse, video monitor, printer, and the like.

Also connected to the system bus 124 is a memory 126, which may be primary and/or secondary memory. The memory 126 stores a set of executable programs utilized to implement features of the invention. In particular, the memory 126 stores a system management module 128, which performs general supervisory operations. The memory also stores a VIDS provisioning module 130.

The VIDS provisioning module 130 operating with the provisioning module 110 of the sensor management system 26 enables service providers (e.g., Internet Service Providers or Managed Security Service Providers) to supply intrusion protection to multiple subscribers with one integrated platform. More particularly, the VIDS provisioning module 130 allows different subscribers to view designated traffic information associated with their logical traffic paths, as defined in the sensors.

The VIDS provisioning module 130 facilitates protection for multiple traffic streams for different subscribers using a single sensor platform while maintaining security separation. The module 130 supports different security policies, protection objectives, and security management preferences effectively and efficiently. The module 130 reduces the management task and total cost of providing intrusion detection security services.

The VIDS module 130 allows a user to specify a subscriber's view and a subscriber configuration. A VIDS view restricts the intrusion information shared with a subscriber to the subset related to the subscriber configuration. A subscriber is allowed to use VIDS interfaces to configure the VIDS as if it were a physical device.

The VIDS provisioning module 130 operates in conjunction with a sensor 22 and the update server 38. As discussed below, the update server 38 is used to notify customers of new software or network intrusion signature updates. The update server 38 also provides the software images and signature files for download. As previously discussed, the sensor 22 performs signature matching against network traffic and generates responses in case of intrusions. A sensor 22 accepts configuration and control messages and sends intrusion alerts and/or events to the sensor management system 26. The requirement for a sensor to support VIDS is simple. Since each VIDS can customize the response in the face of an intrusion, a sensor must be able to generate VIDS specific responses. In addition, the sensor 22 labels all alerts and events sent to the sensor management system 34 with VIDS identifiers so that the sensor management system 34 does not have to spend extra computer resources in filtering VIDS events.

The VIDS provisioning module 130 operating on the sensor management system 34 is central to the VIDS implementation. It stores VIDS definitions and enforces VIDS view, configuration, and access control restrictions using a role-based system. The VIDS module 130 provides a window into the sensor management system 34 for the IDS service provider's customer, also referred to as the subscriber. The service provider has made available a part of the sensor for subscriber use and the virtual IDS provides the subscriber with the capability to manage the allocated resources. Virtual IDS resource allocation is based on one of the following: (1) sensor identification and port number; (2) VLAN ID for traffic belonging to a subscriber; and (3) IP address range that belongs to the subscriber. There are several major IDS components involved in supporting the VIDS features: user and security management, user interface, intrusion signature and response configuration, and real-time VIDS recognition in the sensor. These components are discussed below.

The VIDS provisioning module 130 implements a role based management system. A user role is defined as a group of actions that can be performed on a given device. It is the basis of the authorization framework. Roles must be tied to a resource.

There are two kinds of resources in the sensor management system: the sensor management system itself and the VIDS. Anyone with a sensor management system role is automatically mapped to all system-wide operations, since the sensor management systems 34 in the network 20 mirror one another. Each VIDS has a unique identifier (ID). The VIDS provisioning module 130 enforces security.

In one embodiment of the invention, there are five role types: system administrator, analysis/operator, user management, intrusion expert, and monitoring. A system administrator is allowed to perform simple administrative tasks, such as start/stop processes and database configuration. An analysis/operator is allowed to perform routine maintenance tasks. A user management role allows certain management tasks, such as adding or deleting role assignments. An intrusion expert is a person responsible for configuration and monitoring of intrusion related matters. A monitoring role provides read-only access.

Preferably, the VIDS provisioning module 130 implements a graphical user interface (GUI). The GUI enables the subscriber to access the sensor management system 34 to manage and monitor the VIDS. The GUI can be implemented within a browser, either as an applet or using HTML.

Those skilled in the art will recognize a number of advantages associated with the VIDS provisioning module 130. First, it supports flexible delegation of administrative tasks in a scalable manner. In a large-scale service provider environment, this is of particular importance considering the large number of potential intrusion events that could easily overwhelm a centrally managed system. Second, the VIDS opens a window for subscribers to view information related to their own systems that is otherwise unavailable. Third, it reduces the total cost of ownership for the service provider and its subscribers. Fourth, it provides an easy to deploy and manage solution for a large number of subscribers.

The global sensor management system 34 of FIG. 14 also stores a DDOS tracking monitor 132. The concept of a distributed denial of service (DDOS) attack has been previously introduced and discussed in connection with the sensor 22. The DDOS tracking monitor 132 includes executable code to implement multi-sensor collaborative techniques in identifying DDOS attacks. The operation of the DDOS tracking monitor 132 is more fully appreciated in connection with FIG. 1. Sensor 27_0 monitors traffic on the physical link connecting the protected server 32 to the enterprise network 30. Sensors 27_1 through 27_N monitor the links that connect the enterprise network 30 to Internet service providers 28_1 through 28_N. Although the sensors 24 and 26 may be deployed to monitor links on the outside of firewalls, on the inside of firewalls, or both, this fact is not distinguished in this example. As previously indicated, the sensors 22 are managed by a hierarchy of sensor management systems 26 and the global sensor management system 34.

The DDOS tracking monitor 132 implements multi-sensor collaboration as follows. All sensors 22 are controlled by the global sensor management system 34. The sensors may be deployed initially by the management system 34 or, when activated, they can register with the management system 34. The sensors are identified by their topological location with respect to the target of protection (i.e., protected server 32). Sensor 27_0 sees the aggregate of all traffic passing through sensors 27_1 through 27_N that is destined for the protected server 32. The global management system 34 pushes statistical profiles to all of the upstream sensors 27_1 through 27_N.

Each sensor 22 or 24 inserts probe packets or path markers in the traffic it processes. The DDOS tracking monitor 132 specifies the frequency for generating these markers. The frequency is dependent upon the characteristics of the target, such as the information it stores and the vulnerability to attack. The frequency is also dependent upon the relative distance between the sensor and the target.

In one embodiment, the DDOS tracking monitor 132 correlates sensor information to detect a DDOS attack (in other embodiments, DDOS detection can be performed remotely and the results transmitted to the tracking monitor 132). The correlation rules utilized by the DDOS tracking monitor to detect an attack may consider any number of factors. For example, a rate increase of greater than X Mbps/sec observed by Y active sensors comprising greater than Z % of the total contributing links characterizes a pending DDOS attack on the target coming from the links crossing the threshold. In this example, the selection of X, Y, and Z is based on the tolerable load at the target as well as the latency to respond to the threat (e.g., activation of rate limiting at the corresponding boundaries). Another example correlation rule tracks every active sensor and generate an alert when traffic exceeds a predetermined high water mark for a given zone, such as a single server, a sub-net, an enterprise network, and the like. As yet another example, a novel attack detection method is also disclosed in the co-pending U.S. patent application referenced previously. These and other methods of DDOS attack detection are encompassed by the present invention, which in this aspect simply discloses the detection of DDOS attacks.

Thus, the DDOS tracking monitor 132 operates in conjunction with a set of provisioned sensors that insert path markers into network traffic directed toward a protected computer. The DDOS tracking monitor 132 identifies when the path markers and network traffic match a distributed denial of service attack profile. In response to this situation, the DDOS tracking monitor 132 initiates measures to deny access to the protected computer. The DDOS tracking monitor 132 may subsequently be used to analyze the path markers to identify a source of a distributed denial of service attack.

Figure 15:
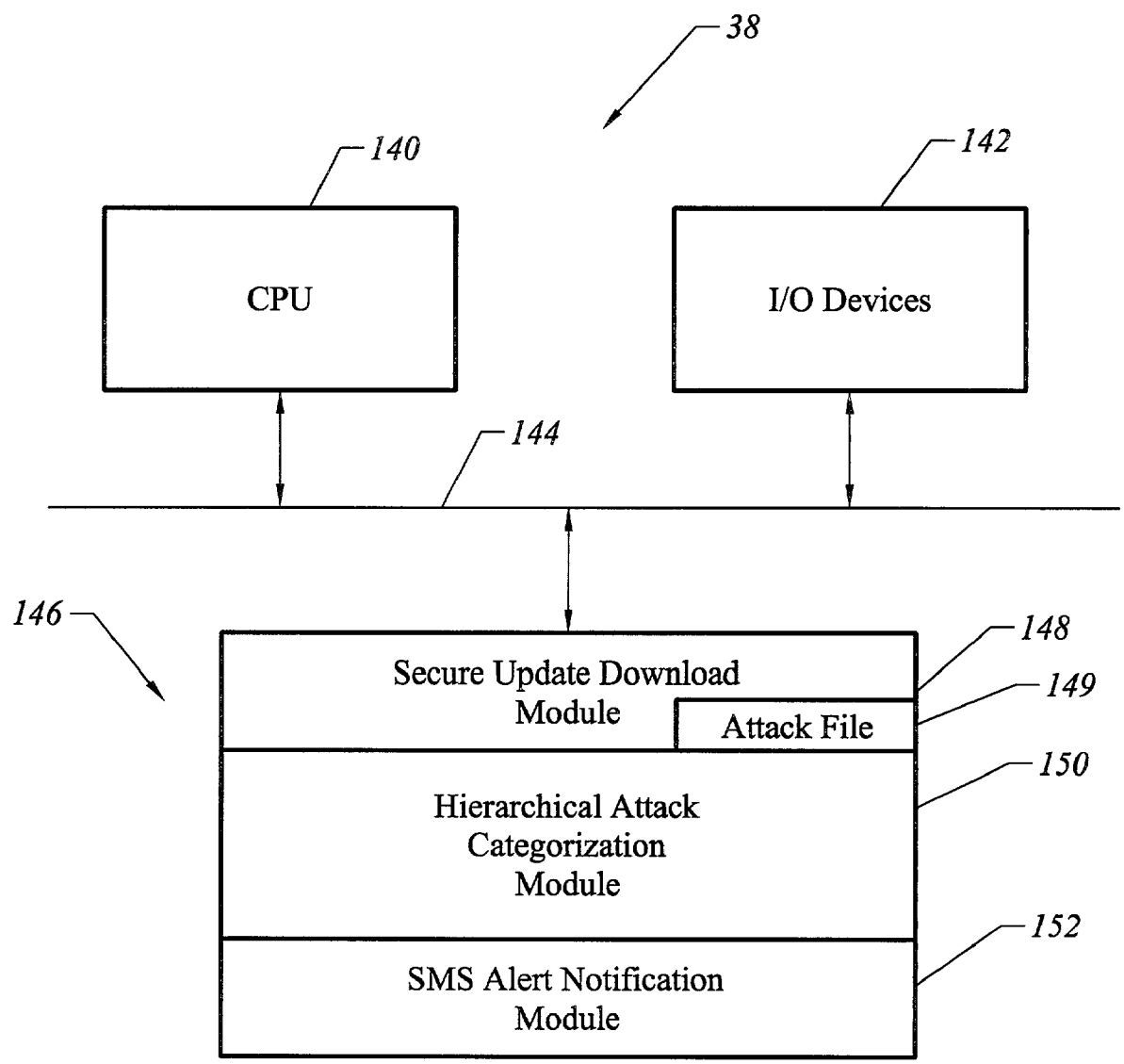
FIG. 15 illustrates an update server implemented in accordance with an embodiment of the invention.

The components of the sensor management system 34 have now been fully described. Therefore, attention turns to a description of the update server 38, which is depicted in FIG. 15. The update sever 38 of FIG. 15 includes standard computer components of a central processing unit 140 and a set of input/output devices 142, which communicate over a system bus 144. A memory 146 is also connected to the system bus 144. The memory stores a set of executable programs to implement the functions of the update server. In particular, the memory stores a secure update download module 148 and a hierarchical attack categorization module 150.

The secure update download module 148 includes executable code to download an attack file 149 to a sensor management system 26. The attack file 149 specifies attacks and counter measures. Preferably, the file also identifies unknown attacks and suggests responses for such attacks. The attack file 149 includes information forming the intrusion signatures 70 processed by the classification and pattern-matching module 68.

The attack file 149 can be downloaded using different approaches. The secure update download module 148 can periodically download the attack file 149. Alternately, the secure update download module can download the attack file 149 in response to a request from a sensor management system 26. Alternately, email alerts may also be used to deliver updated attack files 149. The SMS alert notification module 152 may be used to send alerts by secure e-mail (e.g., SMIME) when a new signature update is available for download.

In one embodiment of the invention, the sensor management system 26 uses HTTP/SSL to communicate with the secure update download module 148. Since the sensor management system 26 resides behind the firewall 36, it is easier to utilize a PULL methodology to download the rules. A PUSH methodology requires opening holes in the firewall. The sensor management system 26 authenticates itself to the update server 38 prior to receiving an attack file 149.

The attack file 149 may be formed utilizing the hierarchical attack categorization module 150 of the invention. The hierarchical attack categorization module 150 is used to develop, deploy and manage information on different computer attacks and countermeasures. In one embodiment of the invention, potential attack space is defined in terms of a set of categories, for example, including probes and port scans, compromise of confidentiality, compromise of authentication, compromise of data integrity, denial of services, and direct violation of security policies. Dividing the potential attack space in this manner allows one to have greater insight into the nature of the attack and its manifestations. Accordingly, it is easier to tailor a response to the attack.

Probes and port scan attacks represent reconnaissance efforts from an attacker in preparation for additional attacks. Examples of this category include pings for live hosts, tests for operating system types, and TCP port scans for active Internet services. Compromise of confidentiality attacks cause direct expose to sensitive information, such as certain system files, director structures, or other user files. Examples in this category include sniffing of a sub-net, transmitting confidential information via stealthy (e.g., HTTP tunneled) channels, or forcing system core dumps.

Compromise of authentication/authorization attacks entail an attacker obtaining unauthorized access privileges. There are often more serious consequences from such attacks if they are not dealt with quickly. For example, that attacker can install backdoors to allow easy access for future attacks. Examples of this category include the well-known send mail attack to obtain illegal shells on a local machine, TCP connection hijacking, and the set of buffer-overflow related attacks.

A compromise of data integrity entails the corruption of sensitive data. It can also have secondary impact if not detected or rectified quickly. For example, a successful "binmail" attack can result in an altered ".rhosts" file, which gives the attacker future logins without a password.

A direct violation of security policy is another form of attack. Although this category most often produces an impact characterized by one of the previous five categories, sometimes the misuse may not produce any observable impact, or at least not immediately. If one recognizes this special category and recognizes that there are well-defined policies governing the use of privileges, one can detect the misuse as soon at it occurs, even in the absence of a serious impact.

A final form of attack associated with this example is the denial of service attack. This type of attack is discussed above.

In addition to defining attack categories, it is useful to define attack target platforms. In one embodiment of the invention, the following hierarchy is identified: (1) vendor (e.g., SUN, IBM, HP, SGI, CISCO), (2) device (e.g., workstation, server, router, firewall), (3) operating system (e.g., Solaris, Linux, MAC OS), and (4)version/revisions.

Attack target services can also be categorized. By way of example, target services may include: HTTP, DNS, SMTP, FTP, telnet, NFS, and the like. Attack launch platforms may also be categorized. The same hierarchical structure can be used as in the case of an attack target. Monitoring points may also be defined. Monitoring points refer to the places or platforms from which any event related to an attack can be observed. The same general hierarchy for describing the attack target can be used for describing the monitoring points, except that for attacks launched across the network (as opposed to a local user from the console) any link on the path should be considered a viable monitoring point.

Figure 16:
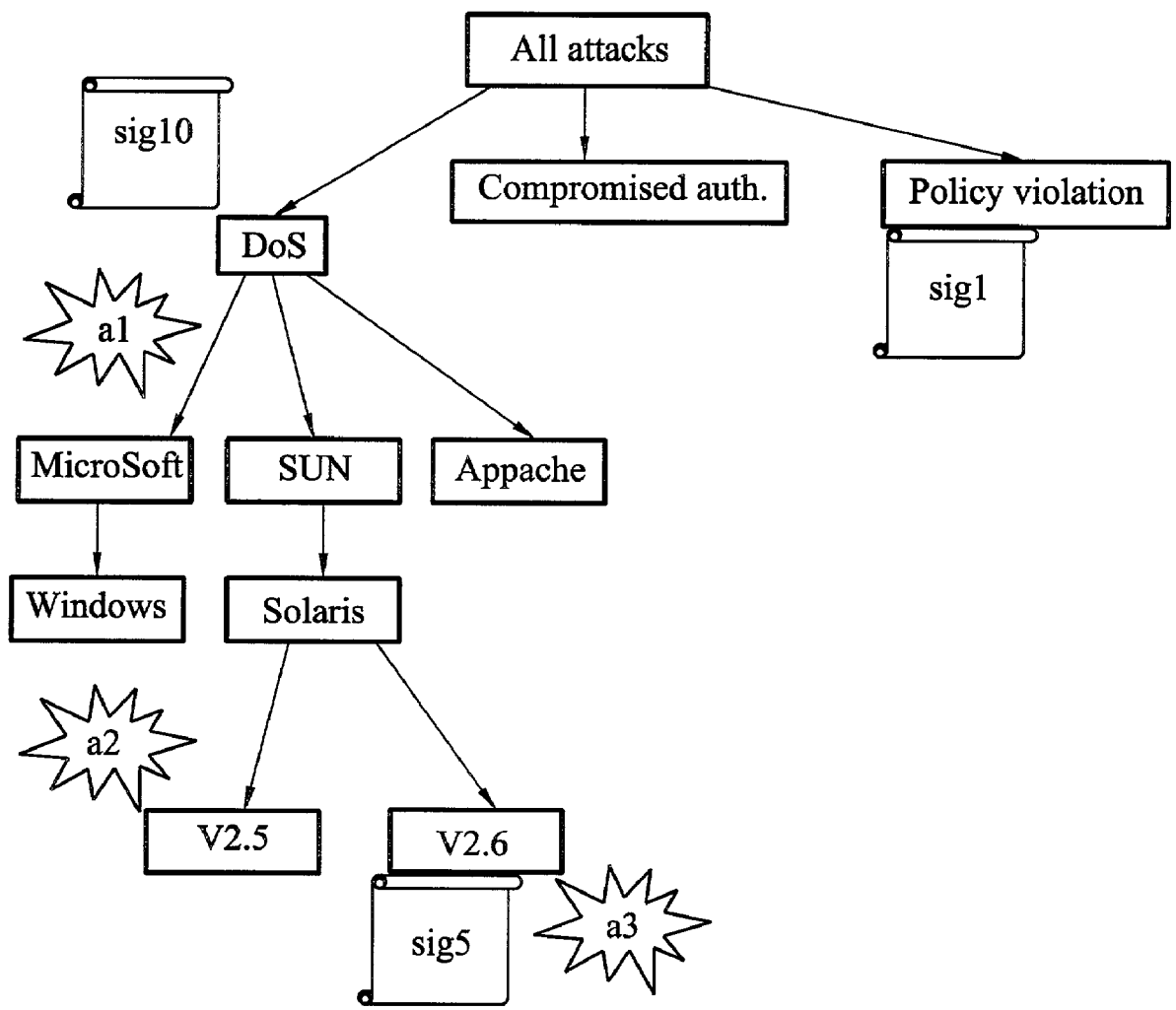
FIG. 16 illustrates a hierarchical attack categorization structure constructed and utilized in accordance with an embodiment of the invention.

Each identified attack is assigned a serial number, called a sigID. Anomaly-based detection mechanisms can also be assigned a unique sigID so that they can be assigned to a coverage map. The coverage map can be viewed as an attack categorization tree with detection sigIDs attached to the nodes of the tree, as shown in FIG. 16. The tree is created using categorization dimensions of the type discussed above. At the top level all attacks are mapped according to the attack impact. At the next level, the attacks are further categorized based on the attack target platform, which is itself a hierarchy. Any attack is only attached to one node of the tree. For example, attack a1 is attached to the denial of service node because it is a general denial of service attack that applies to all the platforms. Attack a3 is only attached to the leaf node v2.6 because it only affects SUN Solaris 2.6

Detected signature identifications (with anomaly detection mechanisms treated as special signatures) are also attached to the tree node. Again, a more general signature will be attached to nodes closer to the root because they cover larger numbers of specific target platforms, while the most specific signature is attached to a leaf node, such as sig5.

Figure 17:
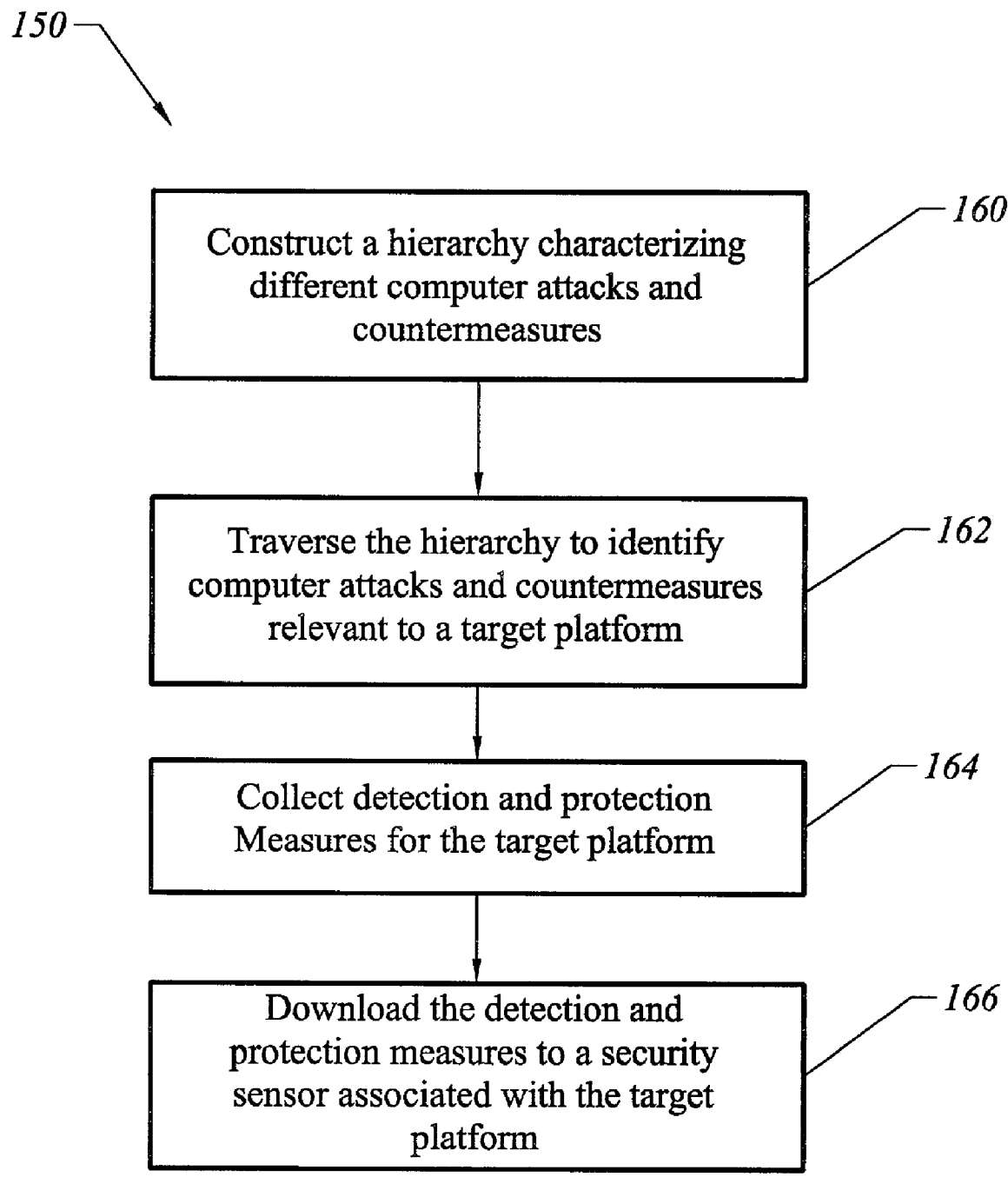
FIG. 17 illustrates processing steps performed in accordance with a hierarchical attack categorization process utilized in accordance with an embodiment of the invention.

FIG. 17 illustrates processing steps performed by an embodiment of the hierarchical attack categorization module 150 of the invention. The module initially constructs a hierarchy characterizing different computer attacks and countermeasures (block 160). This operation results in a structure of the type shown in FIG. 16. The hierarchy is then traversed to identify computer attacks and countermeasures relevant to the target platform (block 162). Detection and protection measures for the target platform are then collected (block 164). This can result in an attack file 149. A sensor is then supplied, through a download, with the protective software (e.g., the attack file) for the target platform (block 166).

The hierarchical approach of the invention allows one to clearly describe, in one data structure, what attacks a given environment is vulnerable to, what protection means (mechanisms and signatures) are available, and how detection alerts are correlated. Processes for utilizing this representation constitute effective methods for deployment and operation of the solution, for analysis of alerts, and for security management.

It should be recognized that the various novel components of the architectures described above can be combined to afford users maximum protection against attacks. For instance, DDOS source detection, anomaly-based intrusion detection, and signature-based intrusion detection can be implemented on a redundant sensor architecture to make them more robust. Similarly, the update server 38 can be configured to update both sensors 22 and redundant sensors 24 with updated attack signatures, anomaly profiles, and the like. The various attack detection methods (i.e., anomaly-based, signature-based, etc.) can also be performed on information decrypted by the various decryption methods of the invention. These and other combinations should be apparent from the previous discussion.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It in intended that the following claims and their equivalents define the scope of the invention.

What is claimed is:

1. A method of forming a virtual intrusion detection system, comprising:

positioning a set of sensors in a network environment, each sensor supporting multiple logical traffic paths; and providing a set of sensor management systems corresponding to said set of sensors, said set of sensor management systems enforcing a set of virtual intrusion detection systems, wherein each virtual intrusion detection system corresponds to a predetermined logical traffic path through said set of sensors, each virtual intrusion detection system providing sensor traffic information solely to authorized parties;

wherein each of the logical traffic paths is associated with a subscriber;

wherein virtual intrusion detection services are provided differently for each of the subscribers based on subscriber input;

wherein resources of the virtual intrusion detection systems are each allocated based on an IP address range that is associated with one of the subscribers;

wherein each of the sensor management systems includes a virtual intrusion detection system provisioning module to perform local virtual intrusion detection system operations as coordinated by the virtual intrusion detection system provisioning module, the local virtual intrusion detection system operations providing intrusion protection for multiple subscribers utilizing one integrated platform.

2. The method of claim 1, wherein the resources of the virtual intrusion detection systems are each allocated based on a sensor identifier.

3. The method of claim 1, wherein the resources of the virtual intrusion detection systems are each allocated based on a port number.

4. The method of claim 1, wherein the resources of the virtual intrusion detection systems are each allocated based on an identifier for traffic belonging to one of the subscribers.

5. The method of claim 1, wherein user roles are defined each with a unique corresponding capability with respect to the virtual intrusion detection systems.

6. The method of claim 5, wherein the user roles are selected from the group consisting of a system administrator, an analyzer/operator, a user manager, an intrusion expert, and a monitor.

7. The method of claim 5, wherein the user roles include a system administrator, an analyzer/operator, a user manager, an intrusion expert, and a monitor.

8. The method of claim 1, wherein the virtual intrusion detection systems each include said set of sensors in the network environment.

9. The method of claim 8, wherein the virtual intrusion detection systems each include the set of sensor management systems corresponding to said set of sensors.

10. The method of claim 1, wherein the virtual intrusion detection services are provided differently by supporting different security policies.

11. The method of claim 1, wherein the virtual intrusion detection services are provided differently by supporting different protection objectives.

12. The method of claim 1, wherein the virtual intrusion detection services are provided differently by supporting different security management preferences.

13. The method of claim 1, wherein the virtual intrusion detection system provisioning module facilitates protection for multiple traffic streams for different subscribers using a single sensor platform while maintaining security separation.

14. A system for forming a virtual intrusion detection system, comprising:

a set of sensors positioned in a network environment, each sensor supporting multiple logical traffic paths; and a set of sensor management systems corresponding to said set of sensors, said set of sensor management systems enforcing a set of virtual intrusion detection systems, wherein each virtual intrusion detection system corresponds to a predetermined logical traffic path through said set of sensors, each virtual intrusion detection system providing sensor traffic information solely to authorized parties;

wherein each of the logical traffic paths is associated with a subscriber;

wherein virtual intrusion detection services are provided differently for each of the subscribers based on subscriber input;

wherein resources of the virtual intrusion detection systems are each allocated based on an IP address range that is associated with one of the subscribers;

wherein each of the sensor management systems includes a virtual intrusion detection system provisioning module to perform local virtual intrusion detection system operations as coordinated by the virtual intrusion detection system provisioning module, the local virtual intrusion detection system operations providing intrusion protection for multiple subscribers utilizing one integrated platform.

* * * * *